(12) United States Patent
Tanaka

(10) Patent No.: US 10,911,679 B2
(45) Date of Patent: Feb. 2, 2021

(54) IMAGE SHAKE CORRECTION DEVICE, IMAGING DEVICE, IMAGE SHAKE CORRECTION METHOD, AND IMAGE SHAKE CORRECTION PROGRAM

(71) Applicant: FUJIFILM Corporation, Tokyo (JP)

(72) Inventor: Koichi Tanaka, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 16/912,620

(22) Filed: Jun. 25, 2020

(65) Prior Publication Data

US 2020/0329200 A1 Oct. 15, 2020

Related U.S. Application Data

(63) Continuation of application No. PCT/JP2018/048298, filed on Dec. 27, 2018.

(30) Foreign Application Priority Data

Dec. 27, 2017 (JP) ................................. 2017-252253

(51) Int. Cl.
*H04N 5/225* (2006.01)
*H04N 5/232* (2006.01)

(52) U.S. Cl.
CPC ..... *H04N 5/23287* (2013.01); *H04N 5/23258* (2013.01)

(58) Field of Classification Search
CPC .................................................... H04N 5/349
See application file for complete search history.

(56) References Cited

U.S. PATENT DOCUMENTS

2006/0257128 A1* 11/2006 Ishito ..................... G03B 17/00
396/55
2007/0003263 A1* 1/2007 Nomura ............... H04N 5/2254
396/55
(Continued)

FOREIGN PATENT DOCUMENTS

JP 2006-071743 A 3/2006
JP 2007-028008 A 2/2007
(Continued)

OTHER PUBLICATIONS

International Search Report issued in PCT/JP2018/048298; dated Feb. 5, 2019.
Written Opinion issued in PCT/JP2018/048298; dated Feb. 5, 2019.

*Primary Examiner* — Twyler L Haskins
*Assistant Examiner* — Dwight Alex C Tejano
(74) *Attorney, Agent, or Firm* — Studebaker & Brackett PC

(57) ABSTRACT

A digital camera (100) includes a drive unit that moves a movable unit including an imaging element (20) in directions X, Y, and θ, and a system controller (108) that controls the drive unit. The system controller (108) selectively performs a first control for moving the movable unit in at least one direction of the direction X, the direction Y, or the direction θ, and a second control for prohibiting movement of the movable unit in the direction θ and moving the movable unit only in at least one direction of the direction X or the direction Y, and the controller sets a movable range of the movable unit in the direction X and the direction Y in a case where the second control is performed to be wider than the movable range of the movable unit in the first direction and the second direction in a case where the first control is performed.

14 Claims, 15 Drawing Sheets

(56) References Cited

U.S. PATENT DOCUMENTS

| | | | |
|---|---|---|---|
| 2007/0014551 A1 | 1/2007 | Fujisawa et al. | |
| 2008/0145041 A1 | 6/2008 | Enomoto | |
| 2008/0226277 A1 | 9/2008 | Uenaka et al. | |
| 2010/0103251 A1* | 4/2010 | Numako | G02B 27/646 348/61 |
| 2010/0165127 A1* | 7/2010 | Uenaka | H04N 5/2253 348/208.4 |
| 2014/0028862 A1* | 1/2014 | Kawai | G02B 27/0006 348/208.11 |
| 2015/0264266 A1* | 9/2015 | Katsuyama | H04N 5/23209 348/208.2 |
| 2016/0330378 A1* | 11/2016 | Tsuchiya | H04N 5/23258 |
| 2017/0006229 A1* | 1/2017 | Ishikawa | H04N 5/2253 |
| 2017/0013199 A1* | 1/2017 | Kunugi | G02B 7/28 |
| 2017/0019600 A1 | 1/2017 | Koyano | |
| 2017/0019612 A1* | 1/2017 | Kino | H04N 5/23287 |
| 2019/0141246 A1* | 5/2019 | Sugita | G03B 13/22 |

FOREIGN PATENT DOCUMENTS

| | | |
|---|---|---|
| JP | 2008-151822 A | 7/2008 |
| JP | 2008-257211 A | 10/2008 |
| JP | 2010-021614 A | 1/2010 |
| JP | 2010-204341 A | 9/2010 |
| JP | 2014-056057 A | 3/2014 |
| JP | 2017-021253 A | 1/2017 |

\* cited by examiner

IMAGE SHAKE CORRECTION DEVICE, IMAGING DEVICE, IMAGE SHAKE CORRECTION METHOD, AND IMAGE SHAKE CORRECTION PROGRAM

CROSS REFERENCE TO RELATED APPLICATION

This is a continuation of International Application No. PCT/JP2018/048298 filed on Dec. 27, 2018, and claims priority from Japanese Patent Application No. 2017-252253 filed on Dec. 27, 2017, the entire disclosures of which are incorporated herein by reference.

BACKGROUND OF THE INVENTION

1. Field of the Invention

The present invention relates to an image shake correction device, an imaging device, an image shake correction method, and a computer readable medium storing an image shake correction program.

2. Description of the Related Art

An imaging device comprising an imaging element that images a subject through an imaging optical system or a lens device used by being attached to the imaging device has an image shake correction function of correcting shake (hereinafter, referred to as image shake) of a captured image caused by vibration of the apparatus.

For example, in the lens device, image shake correction is performed by moving a correction lens included in an imaging optical system in a surface perpendicular to an optical axis such that the vibration of the apparatus is detected based on information from a motion detection sensor such as an acceleration sensor or angular velocity sensor mounted on the lens device and the detected vibration is canceled.

In the imaging device, the image shake correction is performed by moving one or both of the correction lens included in the imaging optical system and the imaging element on a surface perpendicular to an optical axis such that the vibration of the apparatus is detected based on information from a motion detection sensor such as an acceleration sensor or an angular velocity sensor mounted on the imaging device and the detected vibration is canceled.

JP2010-021614 describes an imaging device that performs image shake correction by moving an imaging element in a horizontal direction and a vertical direction. In this imaging device, a movement range of a movable unit is changed according to a type of a lens to be mounted.

JP2017-021253A describes an imaging device that performs image shake correction by moving an imaging element in a horizontal direction, a vertical direction, and a rotation direction. In this imaging device, a movement range of a movable unit is changed according to a type of a lens to be mounted.

JP2007-028008A describes an imaging device that performs image shake correction by moving an imaging element in a horizontal direction and a vertical direction. In this imaging device, in a case where a lens having a small image circle is attached, movement of a movable unit is prohibited.

JP2006-071743A describes an imaging device that performs image shake correction by rotating an imaging element and moving an imaging lens in a horizontal direction and a vertical direction. In this imaging device, in a case where a focal length is long, the imaging element is not rotated, and thus, suppression of power consumption and reduction of the occurrence of a time lag are achieved.

SUMMARY OF THE INVENTION

In an image shake correction device that performs image shake correction by moving an imaging element, the imaging element may be moved in a rotation direction with a center of a light receiving surface as a rotation center as described in JP2017-021253A and JP2006-071743 A.

In the image shake correction device, a movement range of a movable unit is decided in an image circle. In the configuration in which the imaging element is rotated, in a case where the imaging element rotates in the rotation direction in a state where the imaging element is moved in a horizontal direction and a vertical direction by the maximum amount, it is necessary to provide a margin for rotation around the movement range of the movable unit such that the light receiving surface of the imaging element does not exceed the image circle.

In a case where the image shake is performed by moving the imaging element in the horizontal direction and the vertical direction and in a case where the image shake is performed by moving the imaging element in the rotation direction, the former case has a greater influence on the quality of a captured image. Therefore, the movement range of the movable unit in the horizontal direction and the vertical direction in the movement range of the movable unit is desired to be as large as possible.

However, for example, in a case where an imaging lens having a small image circle is attached to the imaging device, the movement range of the movable unit that can be set is also narrowed. Therefore, in a case where the margin for rotation is provided in this movement range, the movement range of the imaging element in the horizontal direction and the vertical direction is narrowed. As a result, the image shake correction performance cannot be sufficiently secured.

Even though the image circle is fixed as in a fixed lens type imaging device, the image shake correction due to the rotation of the movable unit becomes important or the image shake correction due to the horizontal and vertical movement of the movable unit depending on an imaging scene or a state of a subject.

JP2010-021614A and JP2007-028008A do not consider a case where the imaging element is rotated.

In the imaging device described in JP2017-021253A, in a case where an anti-vibration lens having a high possibility that the image circle is reduced attached, an upper limit value of the amount of rotation of the imaging element is increased. Therefore, the movement range of the imaging element in the horizontal direction and the vertical direction is correspondingly narrowed. Therefore, the image shake correction performance cannot be sufficiently secured.

In the imaging device described in JP2006-071743A, the movable range of the imaging lens in the horizontal and vertical directions is the same in any of a case where the imaging device is not rotated and a case where the imaging element is rotated. Thus, when the movable range of the imaging lens is decided on the assumption that the imaging element is rotated, the movable range is narrowed, and thus, the image shake correction performance cannot be sufficiently secured.

The present invention has been made in view of the aforementioned circumstances, and an object of the present invention is to provide an image shake correction device, an imaging device, an image shake correction method, and a computer readable medium storing an image shake correction program capable of sufficiently securing image shake correction performance regardless of a size of an image circle or an imaging condition.

An image shake correction device of the present invention comprises a drive unit that moves a movable unit including an imaging element in a first direction, in a second direction perpendicular to the first direction, the first direction and the second direction being directions along a light receiving surface of the imaging element, and in a third direction along a circumferential direction of a circle a center of which is a center of the light receiving surface of the imaging element, and a controller that controls the drive unit. The controller selectively performs a first control for moving the movable unit in at least one direction of the first direction, the second direction, or the third direction, and a second control for prohibiting movement of the movable unit in the third direction and for moving the movable unit only in at least one direction of the first direction or the second direction, and the controller sets a movable range of the movable unit in the first direction and the second direction in a case where the second control is performed to be wider than the movable range of the movable unit in the first direction and the second direction in a case where the first control is performed.

An imaging device of the present invention comprises the image shake correction device.

An image shake correction method of the present invention comprises control step of controlling a drive unit that moves a movable unit including an imaging element in a first direction, in a second direction perpendicular to the first direction, the first direction and the second direction being directions along a light receiving surface of the imaging element, and a third direction along a circumferential direction of a circle a center of which is a center of the light receiving surface of the imaging element. In the control step, a first control for moving the movable unit in at least one direction of the first direction, the second direction, or the third direction, and a second control for prohibiting movement of the movable unit in the third direction and for moving the movable unit only in at least one direction of the first direction or the second direction is selectively performed, and a movement range in which the movable unit is able to move in each of the first direction and the second direction in a case where the second control is performed is further set to be wider than the movement range in a case where the first control is performed.

A non-transitory computer readable medium storing an image shake correction program of the present invention causes a computer to execute a control step of controlling a drive unit that moves a movable unit including an imaging element in a first direction, in a second direction perpendicular to the first direction, the first direction and the second direction being directions along a light receiving surface of the imaging element, and in a third direction along a circumferential direction of a circle a center of which is a center of the light receiving surface of the imaging element. In the control step, a first control for moving the movable unit in at least one direction of the first direction, the second direction, or the third direction, and a second control for prohibiting movement of the movable unit in the third direction and for moving the movable unit only in at least one direction of the first direction or the second direction is selectively performed, and a movement range in which the movable unit is able to move in each of the first direction and the second direction in performing the second control is set to be wider than the movement range in performing the first control.

According to the present invention, it is possible to provide an image shake correction device, an imaging device, an image shake correction method, and a computer readable medium storing an image shake correction program capable of sufficiently securing image shake correction performance regardless of a size of an image circle or an imaging condition.

DESCRIPTION OF THE PREFERRED EMBODIMENTS

Hereinafter, embodiments of the present invention will be described with reference to the drawings.

Figure 1:
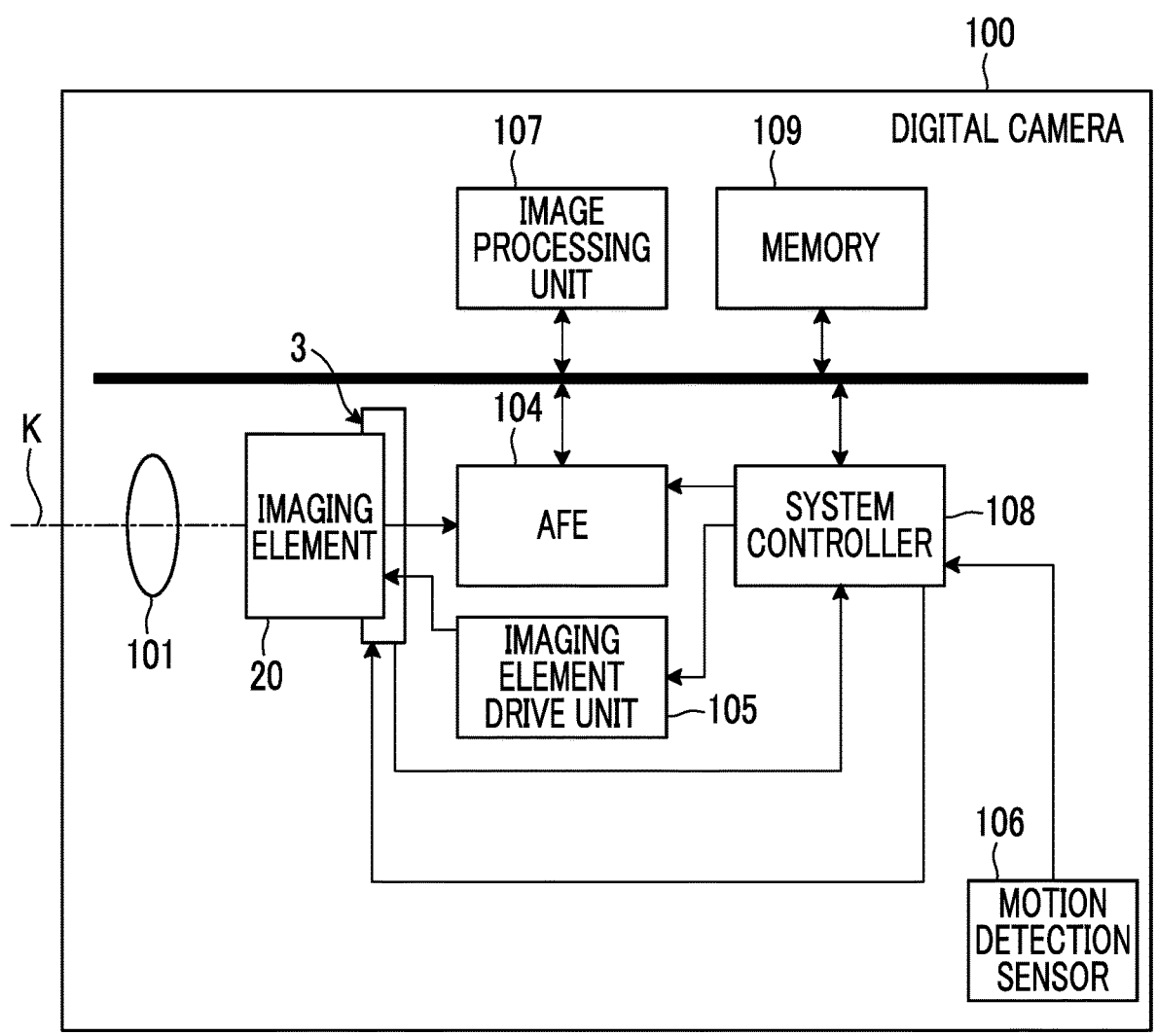
FIG. 1 is a diagram showing a schematic configuration of a digital camera 100 which is an embodiment of an imaging device of the present invention.

FIG. 1 is a diagram showing a schematic configuration of a digital camera 100 which is an embodiment of an imaging device of the present invention.

The digital camera 100 comprises an imaging lens 101, an imaging element 20, an image shake correction mechanism 3, an imaging element drive unit 105 that drives the imaging element 20, an analog front end (AFE) 104, an image processing unit 107, a motion detection sensor 106, a system controller 108 that performs overall control of the entire digital camera 100, and a memory 109.

The imaging lens 101 includes a focus lens or a zoom lens. The imaging lens 101 is attachable and detachable to and from a main body of the digital camera 100.

The imaging element 20 images a subject through the imaging lens 101, and comprises a semiconductor chip on which a charge coupled device (CCD) image sensor or a complementary metal oxide semiconductor (CMOS) image sensor is formed and a package that accommodates the semiconductor chip.

Figure 3:
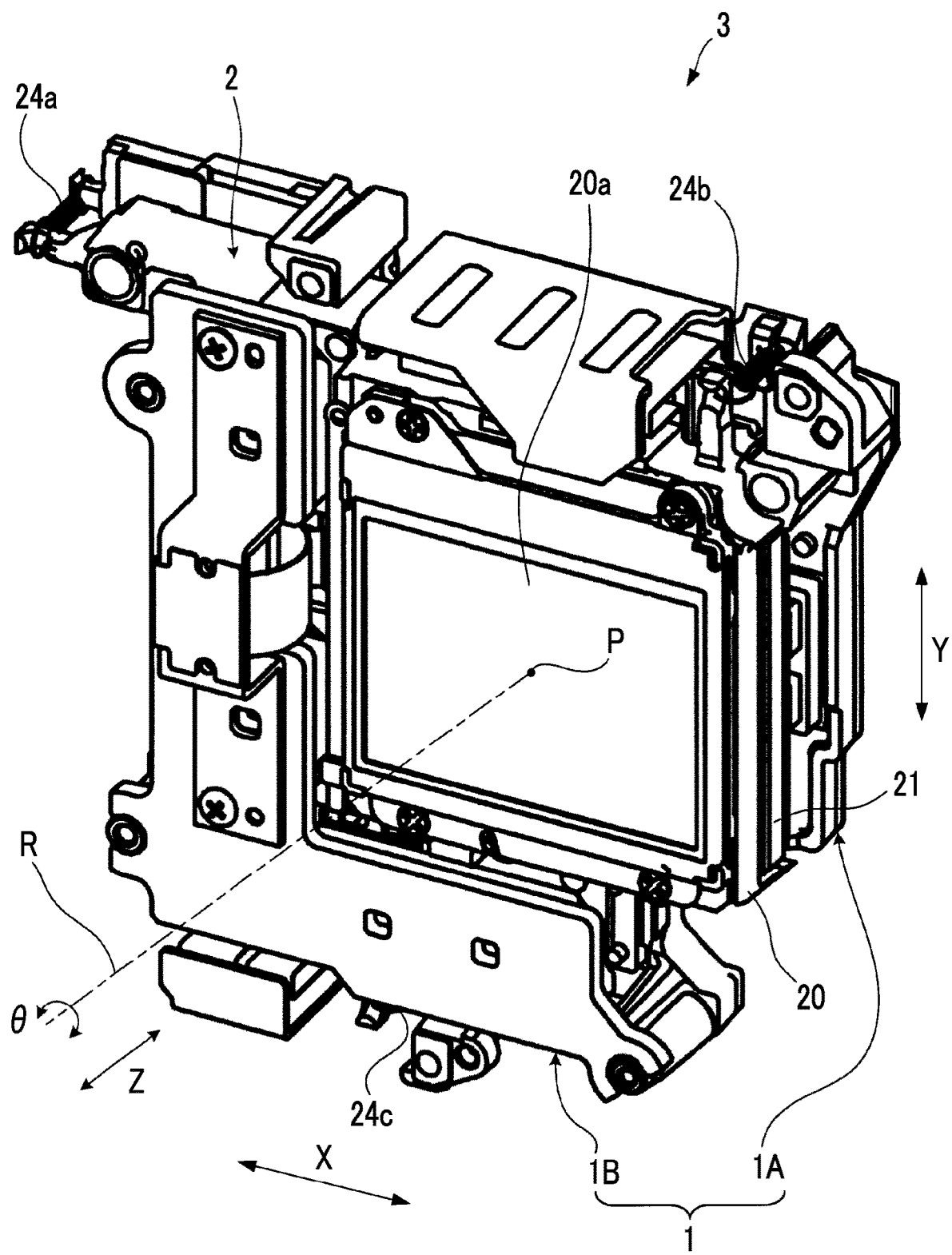
FIG. 3 is a perspective view showing an appearance configuration of the image shake correction mechanism 3 shown in FIGS. 1 and 2.

As shown in FIG. 3 to be described below, a light receiving surface 20a of the imaging element 20 has a rectangular shape.

The image shake correction mechanism 3 corrects image shake of a captured image captured by the imaging element 20 by moving the light receiving surface 20a of the imaging element 20 within a surface perpendicular to an optical axis K of the imaging lens 101.

In the present specification, in the digital camera 100, a state in which the light receiving surface 20a of the imaging element 20 is perpendicular to a gravity direction (a state in which the optical axis K is parallel to the gravity direction) and a state in which the image shake correction mechanism 3 is not energized are referred to as a reference state. In this reference state, a center P (see FIG. 3) of the light receiving surface 20a is located on the optical axis K.

Although the detailed configuration of the image shake correction mechanism 3 will be described below, the image shake is corrected by moving the imaging element 20 in three directions of a first direction which is a lateral direction (direction Y shown in FIG. 3) of the light receiving surface 20a of the imaging element 20 in the reference state, a second direction which is a longitudinal direction (direction X shown in FIG. 3) of the light receiving surface 20a of the imaging element 20 in the reference state, and a third direction which is a direction (direction θ shown in FIG. 3) along a circumference of a circle using the center P of the light receiving surface 20a of the imaging element 20 as a center.

The AFE 104 includes a signal processing circuit that performs correlative double sampling processing and digital conversion processing on imaging signals output from the imaging element 20.

The image processing unit 107 performs digital signal processing on the imaging signals processed by the AFE 104, and generates captured image data such as a Joint Photographic Experts Group (JPEG) format.

The motion detection sensor 106 is a sensor that detects the movement of the digital camera 100, and includes an acceleration sensor, an angular velocity sensor, or both thereof.

The system controller 108 controls the imaging element drive unit 105 and the AFE 104 such that the subject is captured by the imaging element 20 and the imaging signal corresponding to a subject image is output from the imaging element 20.

The system controller 108 controls the image shake correction mechanism 3 based on movement information of the digital camera 100 detected by the motion detection sensor 106. The system controller 108 corrects the image shake of the captured image captured by the imaging element 20 by moving the light receiving surface 20a of the imaging element 20 in at least one of the direction X, the direction Y, or the direction θ.

In a state in which the image shake correction mechanism 3 is energized, in a case where the movement of the digital camera 100 is not detected by the motion detection sensor 106, the system controller 108 controls the image shake correction mechanism 3 such that a position of the light receiving surface 20a of the imaging element 20 is a position in the reference state.

The system controller 108 performs overall control of the entire digital camera 100, and includes various processors that perform processing by executing a program including an image shake correction program.

As the various processors, a central processing unit (CPU) which is a general-purpose processor that executes various processing by executing programs, a programmable logic device (PLD) which is a processor capable of changing a circuit configuration after a field programmable gate array (FPGA) is manufactured, or a dedicated electrical circuit which is a processor having a circuit configuration specially designed to execute specific processing such as an application specific integrated circuit (ASIC).

More specifically, structures of these various processors are electric circuits in which circuit elements such as semiconductor elements are combined.

The system controller 108 may be constituted by one of various processors, or may be constituted by a combination of two or more processors of the same type or different types (for example, a combination of a plurality of FPGAs or a combination of a CPU and an FPGA).

The memory 109 includes a random access memory (RAM) and a read only memory (ROM). The ROM stores programs and various pieces of data necessary for an operation of the system controller 108.

Figure 2:
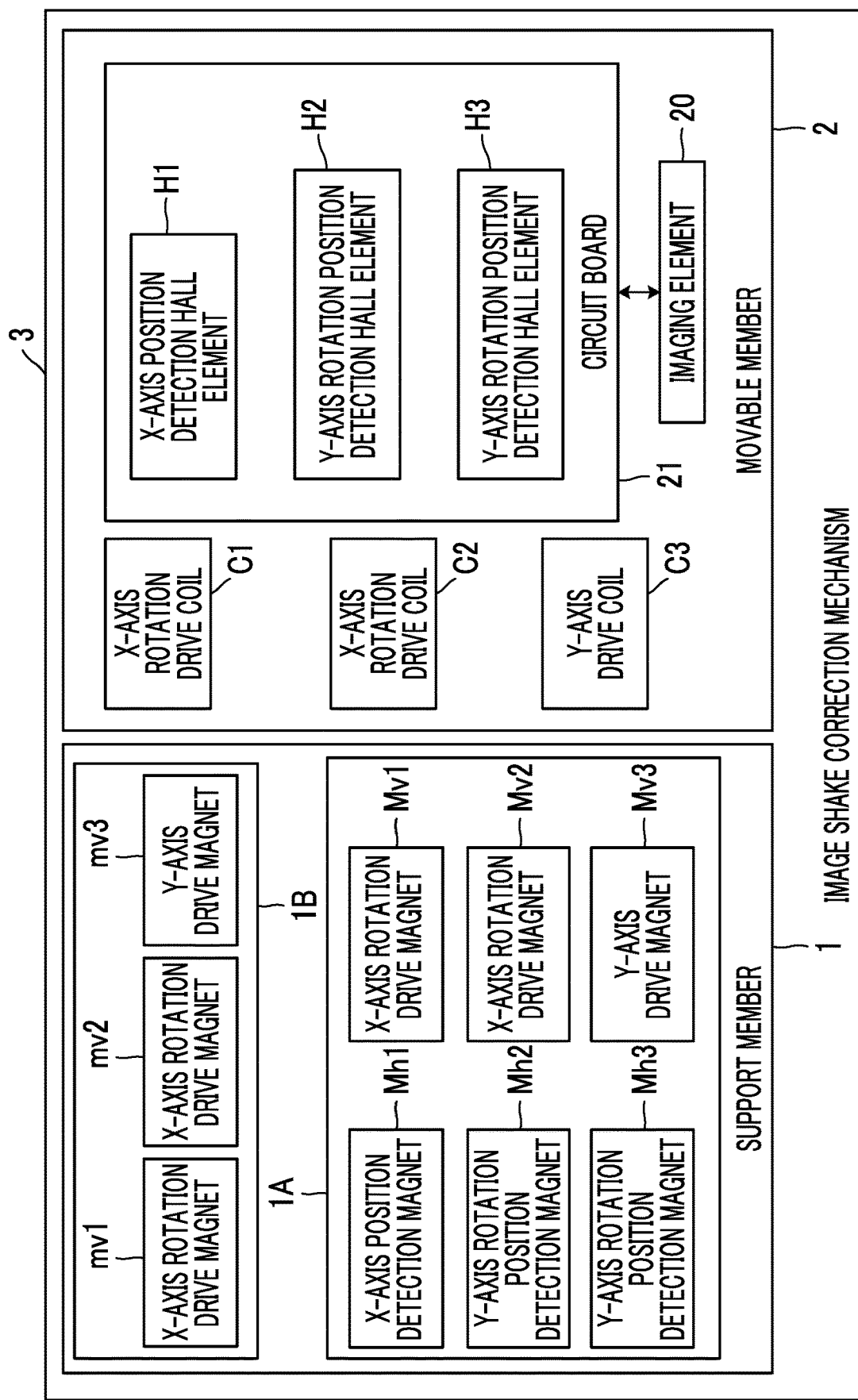
FIG. 2 is a diagram showing a schematic configuration of an image shake correction mechanism 3 in the digital camera 100 shown in FIG. 1.

FIG. 2 is a diagram showing a schematic configuration of the image shake correction mechanism 3 in the digital camera 100 shown in FIG. 1.

The image shake correction mechanism 3 comprises a movable member 2 movable in each of the directions X, Y, and θ, and a support member 1 that supports the movable member 2 to be movable in each of the directions X, Y, and θ.

A circuit board 21 on which the imaging element 20 is fixed (mounted), an X-axis rotation drive coil C1, an X-axis rotation drive coil C2, and a Y-axis drive coil C3 are fixed to the movable member 2. The movable member 2 forms a movable unit.

An X-axis position detection Hall element H1 that is a position detection element for detecting a position of the movable member 2 in the direction X, and a Y-axis rotation position detection Hall element H2 and a Y-axis rotation position detection Hall element H3 which are position detection elements for detecting positions of the movable member 2 in the direction Y and the direction θ are fixed to the circuit board 21.

Output signals of the X-axis position detection Hall element H1, the Y-axis rotation position detection Hall element H2, and the Y-axis rotation position detection Hall element H3 are input to the system controller 108.

The system controller 108 detects a position of the movable member 2 based on the output signals, moves the movable member 2 by controlling a control current flowing through the X-axis rotation drive coil C1, a control current flowing through the X-axis rotation drive coil C2, and a control current flowing through the Y-axis drive coil C3 such that the detected position matches a target position, and corrects the image shake.

The support member 1 includes a first support member 1A and a second support member 1B.

An X-axis rotation drive magnet Mv1, an X-axis rotation drive magnet Mv2, a Y-axis drive magnet Mv3, an X-axis position detection magnet Mh1, a Y-axis rotation position detection magnet Mh2, and a Y-axis rotation position detection magnet Mh3 are fixed to the first support member 1A.

The X-axis rotation drive magnet mv1, the X-axis rotation drive magnet mv2, and the Y-axis drive magnet mv3 are fixed to the second support member 1B.

FIG. 3 is a perspective view showing an appearance configuration of the image shake correction mechanism 3 shown in FIGS. 1 and 2. FIG. 3 shows an appearance of the image shake correction mechanism 3 in the reference state.

As shown in FIG. 3, the image shake correction mechanism 3 comprises the support member 1 constituted by the first support member 1A and the second support member 1B and the movable member 2 to which the circuit board 21 on which the imaging element 20 is mounted is fixed. The movable member 2 is biased against the first support member 1A by springs 24a, 24b, and 24c which are elastic members.

This image shake correction mechanism 3 is fixed to the digital camera 100 main body in a state in which the light receiving surface 20a faces the imaging lens 101 shown in FIG. 1.

The image shake correction mechanism 3 corrects the image shake by moving the movable member 2 in the direction θ using, as a center, a rotation axis R (an axis which is parallel to the gravity direction and passes through the center P in the reference state) which is perpendicular to the light receiving surface 20a and passes through the center P of the light receiving surface 20a, the direction X which is the longitudinal direction of the light receiving surface 20a, and the direction Y which is the lateral direction of the light receiving surface 20a.

Hereinafter, a direction in which the rotation axis R extends is referred to as a direction Z. A flat surface perpendicular to the rotation axis R is a flat surface on which the movable member 2 moves.

The movable member 2 is movable in one direction (left direction) of the direction X and the other direction (right direction) of the direction X from the reference state by the same distance.

The movable member 2 is movable in one direction (up direction) of the direction Y and the other direction (down direction) of the direction Y from the reference state by the same distance.

The movable member 2 is rotatable in one direction (right rotation direction) of the direction θ and the other direction (left rotation direction) of the direction θ by the same angle.

Figure 4:
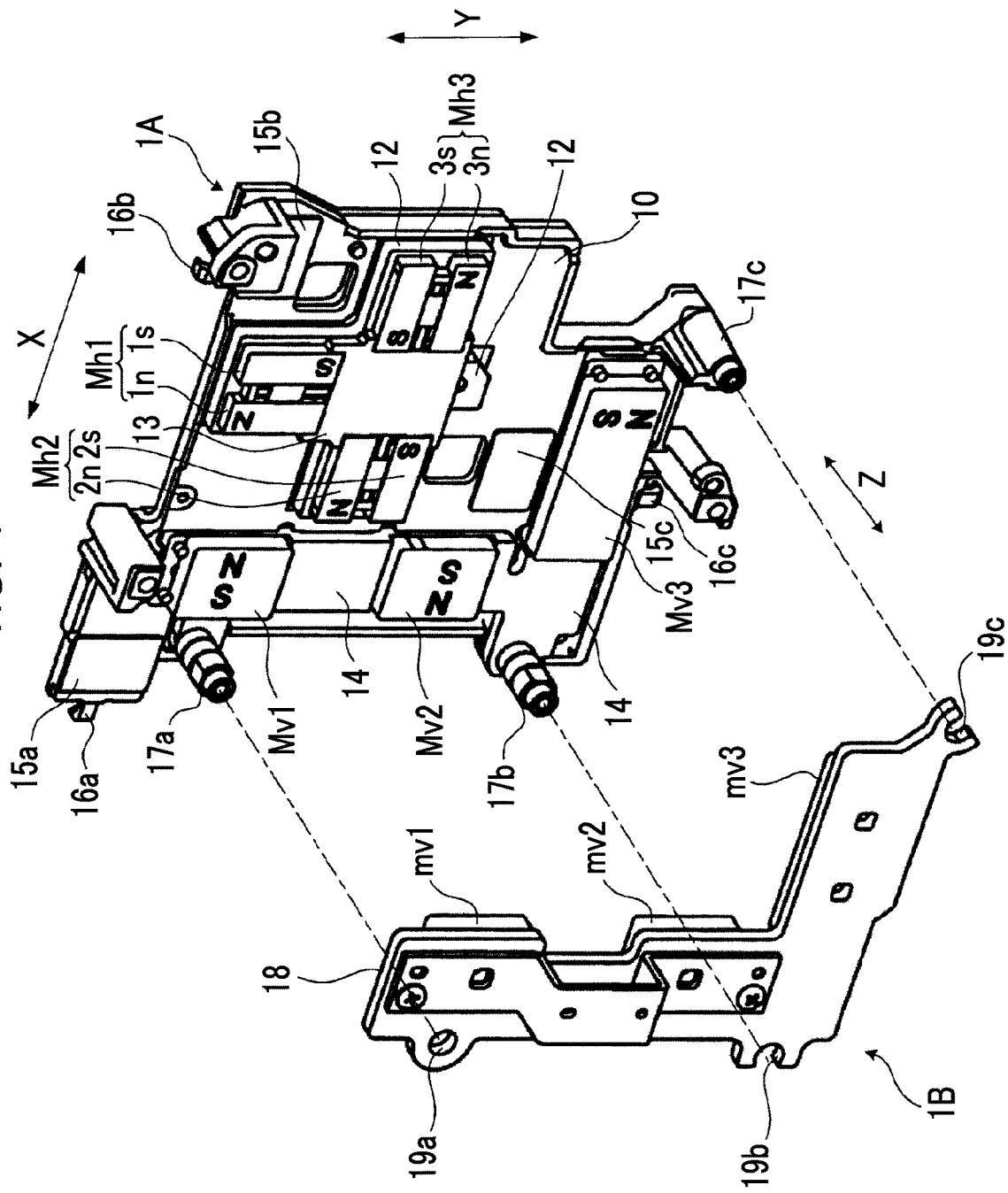
FIG. 4 is an exploded perspective view of a support member 1 in the image shake correction mechanism 3 shown in FIG. 3 is viewed from an imaging lens 101 side.

FIG. 4 is an exploded perspective view of the support member 1 in the image shake correction mechanism 3 shown in FIG. 3 as viewed from the imaging lens 101 side.

As shown in FIG. 4, the first support member 1A comprises a plate-like base 10 that is made of resin and has a flat surface perpendicular to the direction Z, and projecting portions 17a, 17b, and 17c extending in the direction Z from an edge part of the base 10 to the imaging lens 101 side.

The second support member 1B has a substantially L-shaped yoke 18 as viewed from the imaging lens 101 side. A hole portion 19a and notch portions 19b and 19c at positions facing the projecting portions 17a, 17b and 17c are formed at the yoke 18.

In a state in which the movable member 2 is disposed between the first support member 1A and the second support member 1B, the projecting portion 17a of the first support member 1A is fixed by being fitted into the hole portion 19a of the second support member 1B, the projecting portion 17b of the first support member 1A is fixed by being fitted into the notch portion 19b of the second support member 1B, and the projecting portion 17c of the first support member 1A is fixed by being fitted into the notch portion 19c of the second support member 1B. Accordingly, the movable member 2 is supported by the support member 1.

As shown in FIG. 4, substantially L-shaped yokes 14 as viewed from the imaging lens 101 side are formed at a left end portion in the direction X and a lower end portion in the direction Y as viewed from the imaging lens 101 side on a surface of the base 10 on the imaging lens 101 side.

The X-axis rotation drive magnet Mv1 and the X-axis rotation drive magnet Mv2 are arranged and fixed on a front surface of portions of the yokes 14 of the first support member 1A that extends along the direction Y with a space in the direction Y.

The Y-axis drive magnet Mv3 is fixed on a front surface of a portion of the yoke 14 of the first support member 1A that extends along the direction X.

Figure 6:
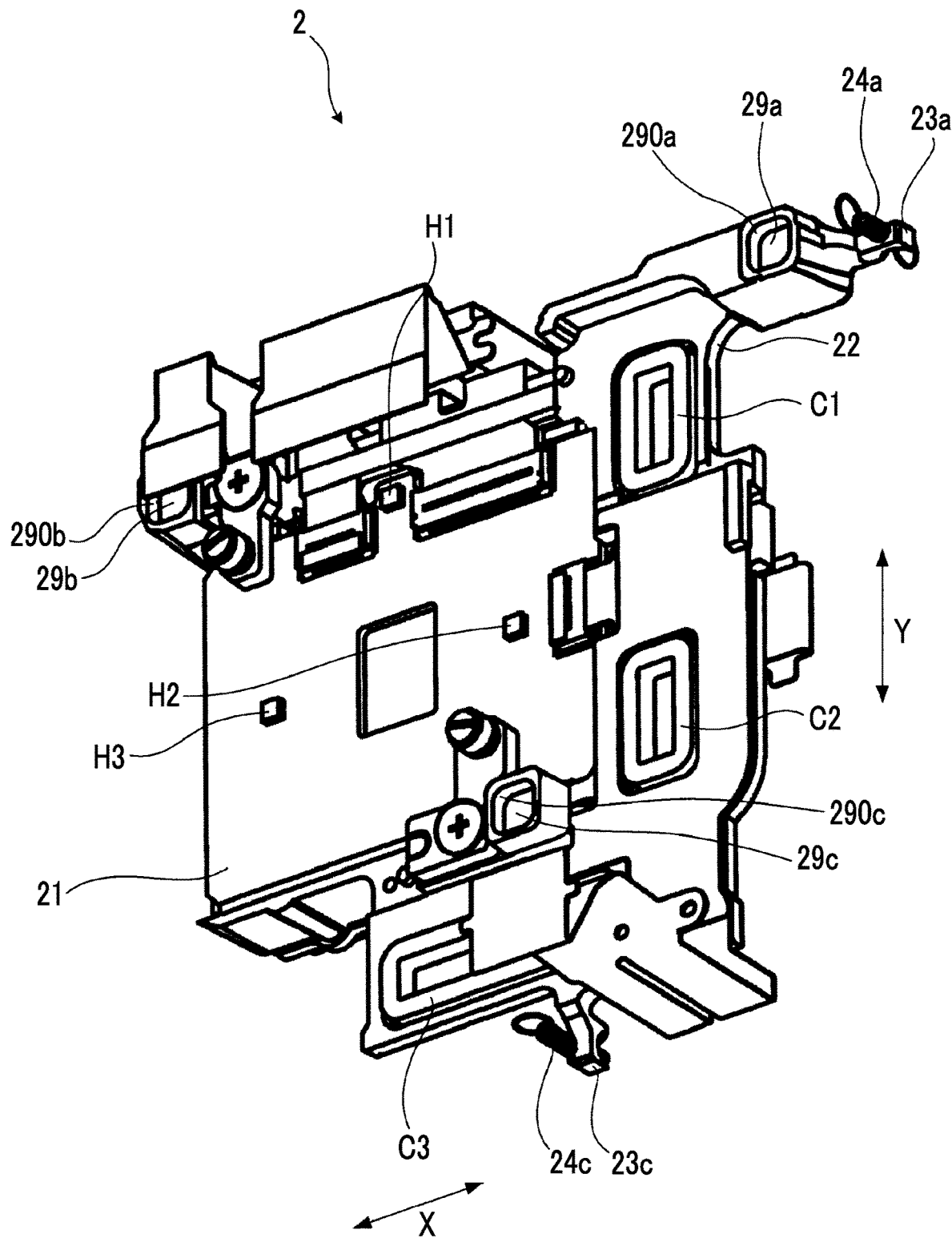
FIG. 6 is a perspective view of the movable member 2 shown in FIG. 5 as viewed from the side opposite to the imaging lens 101 side.

As shown in FIG. 4, the X-axis rotation drive magnet mv1 is fixed on a front surface of the yoke 18 of the second support member 1B on the first support member 1A side at a position facing the X-axis rotation drive magnet Mv1 of the first support member 1A with the X-axis rotation drive coil C1 of the movable member 2 described in FIG. 6 interposed therebetween.

As shown in FIG. 4, the X-axis rotation drive magnet mv2 is fixed on a front surface of the yoke 18 of the second support member 1B on the first support member 1A side at a position facing the X-axis rotation drive magnet Mv2 of the first support member 1A with the X-axis rotation drive coil C2 of the movable member 2 described in FIG. 6 interposed therebetween.

As shown in FIG. 4, the Y-axis drive magnet mv3 is fixed on a front surface of the yoke 18 of the second support member 1B on the first support member 1A side at a position facing the Y-axis drive magnet Mv3 with the Y-axis drive coil C3 of the movable member 2 described in FIG. 6 interposed therebetween.

As shown in FIG. 4, substantially plus-shaped yokes 12 as viewed in the direction Z are formed at a portion facing the circuit board 21 fixed to the movable member 2 described in FIG. 6 on a surface of the imaging lens 101 side of the base 10 of the first support member 1A.

The X-axis position detection magnet Mh1 is fixed on a front surface of the yoke 12 at a position facing the X-axis position detection Hall element H1 (see FIG. 7 to be described below) fixed to the circuit board 21 fixed to the movable member 2.

The Y-axis rotation position detection magnet Mh2 is fixed on the front surface of the yoke 12 at a position facing the Y-axis rotation position detection Hall element H2 (see FIG. 7 to be described below) fixed to the circuit board 21 fixed to the movable member 2.

The Y-axis rotation position detection magnet Mh3 is fixed on the front surface of the yoke 12 at a position facing the Y-axis rotation position detection Hall element H3 (see FIG. 7 to be described below) fixed to the circuit board 21 fixed to the movable member 2.

In the example shown in FIG. 4, the X-axis position detection magnet Mh1, the Y-axis rotation position detection magnet Mh2, and the Y-axis rotation position detection magnet Mh3 are coupled and integrated by a coupling member 13. Since the coupling member 13 is fixed to the yoke 12, the X-axis position detection magnet Mh1, the Y-axis rotation position detection magnet Mh2, and the Y-axis rotation position detection magnet Mh3 are fixed to the first support member 1A.

As shown in FIG. 4, three flat surfaces 15a, 15b, and 15c perpendicular to the direction Z are formed on the surface of the imaging lens 101 side of the base 10. The positions of the flat surfaces 15a, 15b, and 15c in the direction Z are all the same, and these flat surfaces are all formed on the same flat surface.

A hook 16a extending in the direction X in which one end of the spring 24a shown in FIG. 3 is locked, a hook 16b extending in the up direction of the direction Y in which one end of the spring 24b shown in FIG. 3 is locked, and a hook 16c extending in the down direction of the direction Y in which one end of the spring 24c shown in FIG. 3 is locked are formed at a peripheral portion of the base 10.

Figure 5:
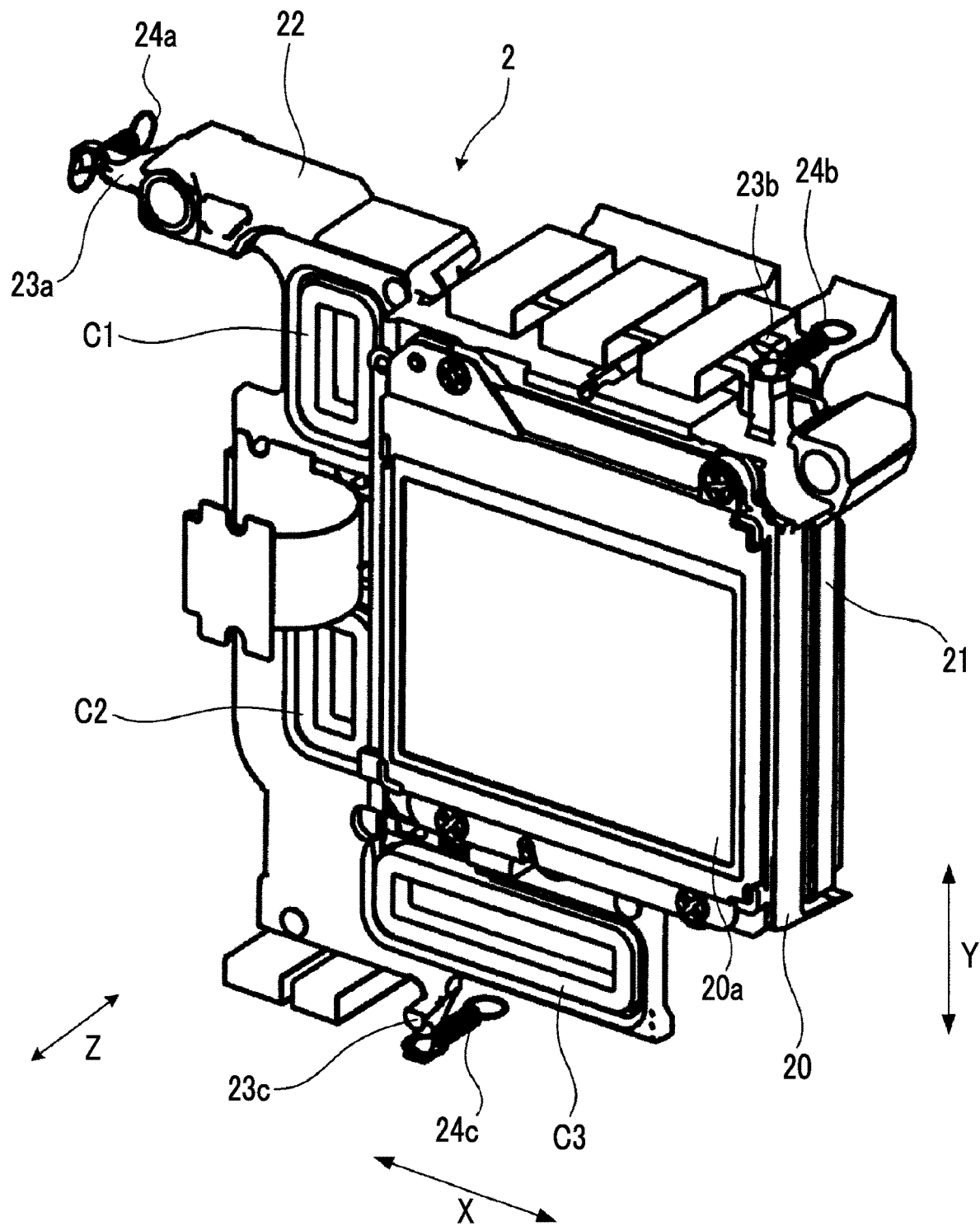
FIG. 5 is a perspective view of a movable member 2 in the image shake correction mechanism 3 shown in FIG. 3 as viewed from the imaging lens 101 side.

FIG. 5 is a perspective view of the movable member 2 in the image shake correction mechanism 3 shown in FIG. 3 as viewed from the imaging lens 101 side.

FIG. 6 is a perspective view of the movable member 2 shown in FIG. 5 as viewed from the side opposite to the imaging lens 101 side.

The movable member 2 comprises a substantially C-shaped base 22 constituted a straight-line-shaped portion extending in the direction X, a straight-line-shaped portion extending in the direction Y from a right end portion of this portion in the direction X, and a straight-line-shaped portion extending to the left side in the direction X from a lower end portion of a portion extending in the direction Y as viewed from the imaging lens 101 side.

As shown in FIGS. 5 and 6, the circuit board 21 on which the imaging element 20 is mounted is fixed to the base 22 with an adhesive at a portion facing a region surrounded by the three portions.

As shown in FIGS. 5 and 6, the X-axis rotation drive coil C1 is formed at the base 22 at a position facing each of the X-axis rotation drive magnets Mv1 and mv1 shown in FIG. 4.

The X-axis rotation drive coil C2 is formed at the base 22 at a position facing each of the X-axis rotation drive magnets Mv2 and mv2 shown in FIG. 4.

The Y-axis drive coil C3 is formed at the base 22 at a position facing each of the Y-axis drive magnets Mv3 and mv3 shown in FIG. 4.

The X-axis rotation drive coil C1 shown in FIGS. 5 and 6 and the X-axis rotation drive magnets Mv1 and mv1 shown in FIG. 4 constitute an X-axis drive voice coil motor (VCM).

The X-axis drive VCM moves the movable member 2 in the direction X by an electromagnetic induction action between the X-axis rotation drive coil C1 and the X-axis rotation drive magnets Mv1 and mv1 by causing a control current to flow through the X-axis rotation drive coil C1.

The X-axis rotation drive coil C2 shown in FIGS. 5 and 6 and the X-axis rotation drive magnets Mv2 and mv2 shown in FIG. 4 constitute a VCM. This VCM and the X-axis drive VCM constitute a rotation drive VCM.

The rotation drive VCM rotates the movable member 2 around the rotation axis R with the center P of the light receiving surface 20a with a rotation center by an electromagnetic induction action between the X-axis rotation drive coil C1 and the X-axis rotation drive magnets Mv1 and mv1 and an electromagnetic induction action between the X-axis rotation drive coil C2 and the X-axis rotation drive magnets Mv2 and mv2 by reversing the directions of the control currents flowing through the X-axis rotation drive coil C1 and the X-axis rotation drive coil C2 shown in FIGS. 5 and 6.

The Y-axis drive coil C3 shown in FIGS. 5 and 6 and the Y-axis drive magnets Mv3 and mv3 shown in FIG. 4 constitute a Y-axis drive VCM.

The Y-axis drive VCM moves the movable member 2 in the direction Y by an electromagnetic induction action between the Y-axis drive coil C3 and the Y-axis drive magnets Mv3 and mv3 by causing the control current to flow through the Y-axis drive coil C3.

The X-axis drive VCM, the Y-axis drive VCM, and the rotation drive VCM constitute a drive unit. The control current flowing through the drive coil of each VCM is controlled by the system controller 108 of FIG. 1. The system controller 108 functions as a controller that controls the drive unit. The drive unit and the system controller 108 constitute an image shake correction device.

As shown in FIG. 6, the X-axis position detection Hall element H1 is fixed at a position facing the intermediate position between the S-pole 1s and the N-pole 1n of the X-axis position detection magnet Mh1 on a surface of the first support member 1A side of the circuit board 21 fixed to the base 22 (hereinafter, referred to as a rear surface of the circuit board 21).

The Y-axis rotation position detection Hall element H2 is fixed at a position facing the intermediate position between the S-pole 2s and the N-pole 2n of the Y-axis rotation position detection magnet Mh2 on the rear surface of the circuit board 21.

The Y-axis rotation position detection Hall element H3 is fixed at a position facing the intermediate position between the S-pole 3s and the N-pole 3n of the Y-axis rotation position detection magnet Mh3 on the rear surface of the circuit board 21.

The X-axis position detection Hall element H1 outputs, as magnetic field information, a signal corresponding to a magnetic field supplied from the X-axis position detection magnet Mh1, and the system controller 108 detects a position of the movable member 2 in the direction X by an output change of this signal.

The Y-axis rotation position detection Hall element H2 outputs, as magnetic field information, a signal corresponding to a magnetic field supplied from the Y-axis rotation position detection magnet Mh2, and the system controller 108 detects a position of the movable member 2 in the direction Y by an output change of this signal.

The Y-axis rotation position detection Hall element H3 outputs, as magnetic field information, a signal corresponding to a magnetic field supplied from the Y-axis rotation position detection magnet Mh3.

The system controller 108 detects, as a position of the movable member 2 in the direction θ, a rotation angle of the movable member 2 around the rotation axis R due to the change of the output signal of the Y-axis rotation position detection Hall element H3 and the change of the output signal of the Y-axis rotation position detection Hall element H2.

As shown in FIG. 6, a recess portion 290a that accommodates a rolling element (spherical ball) for causing the movable member 2 to be movable on a surface perpendicular to the direction Z at a position facing the flat surface 15a of the first support member 1A shown in FIG. 4 is formed at the base 22. A bottom surface 29a of the recess portion 290a is a flat surface perpendicular to the direction Z.

A recess portion 290b that accommodates a rolling element for causing the movable member 2 to be movable on the surface perpendicular to the direction Z at a position facing the flat surface 15b of the first support member 1A shown in FIG. 4 is formed at the base 22. A bottom surface 29b of the recess portion 290b is a flat surface perpendicular to the direction Z.

A recess portion 290c that accommodates a rolling element for causing the movable member 2 to be movable on the surface perpendicular to the direction Z is formed at the base 22 at a position facing the flat surface 15c of the first support member 1A shown in FIG. 4. A bottom surface 29c of the recess portion 290c is a flat surface perpendicular to the direction Z.

The positions of the bottom surfaces 29a, 29b, and 29c in the direction Z are all the same, and the bottom surfaces are all formed on the same flat surface.

The movable member 2 moves on the flat surface perpendicular to the direction Z by rolling the rolling elements disposed between the bottom surface 29a of the movable member 2 and the flat surface 15a of the first support member 1A, between the bottom surface 29b of the movable member 2 and the flat surface 15b of the first support member 1A, and between the bottom surface 29c of the movable member 2 and the flat surface 15c of the first support member 1A.

The system controller 108 shown in FIG. 1 selectively performs, as a control method of the drive unit constituted by the X-axis drive VCM, the Y-axis drive VCM, and the rotation drive VCM, a first control for moving the movable member 2 in at least one direction of the direction X, the direction Y, or the direction θ, and a second control for prohibiting the movement of the movable member 2 in the direction θ and moving the movable member 2 only in at least one direction of the direction X or the direction Y.

The system controller 108 changes a movable range of the movable member 2 in the direction X and the direction Y in a case where the second control is performed is set to be wider than a movable range of the movable member 2 in the direction X and the direction Y in a case where the first control is performed. That is, in a case where the second control is performed, the rotation of the movable member 2 is prohibited, but the movable range of the movable member 2 in the direction X and the direction Y is accordingly wider than the movable range in a case where the first control is performed.

Figure 7:
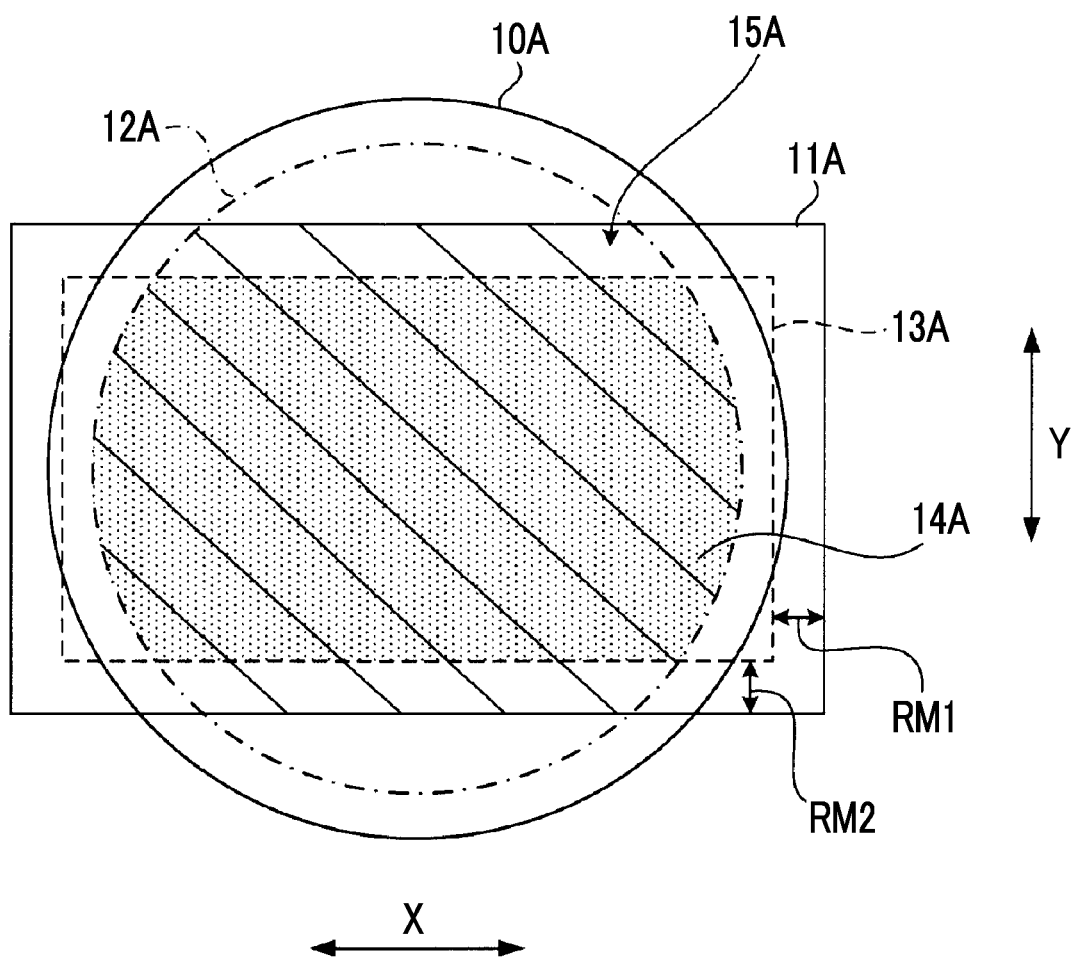
FIG. 7 is a schematic diagram for describing a method of setting a movable range of the movable member 2.

FIG. 7 is a schematic diagram for describing a method of setting the movable range of the movable member 2.

FIG. 7 shows an image circle 10A of the imaging lens 101 (a range in which an optical image is formed or a range in which an undistorted optical image is formed), a maximum movable range 12A which is a mechanical limit range in which the movable member 2 can be moved in the direction X and the direction Y, and a rectangular range 11A in which light passing through the image circle 10A can be transmitted without being blocked by a structure such as a lens hood or a mechanical shutter of the digital camera 100.

In the example shown in FIG. 7, in a case where the movable member 2 is not rotated by moving the movable member 2 in the direction X and the direction Y in a range 15A overlapping the rectangular range 11A of the maximum movable range 12A, the light receiving surface 20a of the imaging element 20 can be positioned in the image circle 10A regardless of the position of the movable member 2.

Figure 8:
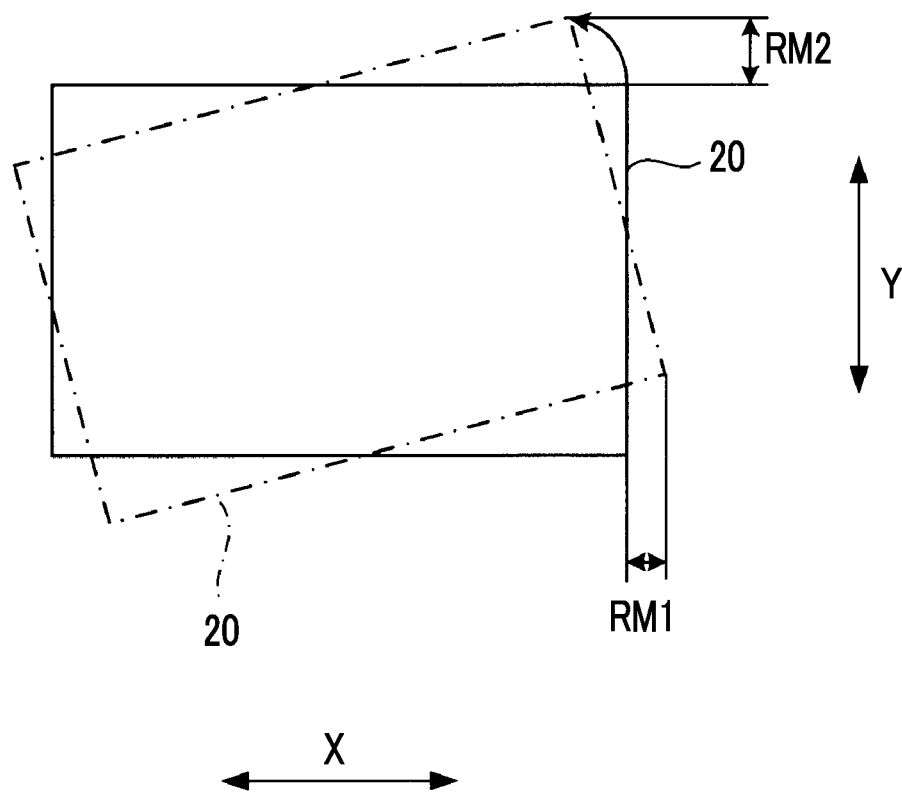
FIG. 8 is a schematic diagram showing a relationship between an unrotated state and a rotated state of an imaging element 20.

FIG. 8 is a schematic diagram showing a relationship between an unrotated state and a rotated state of the imaging element 20.

As shown in FIG. 8, in a case where the imaging element 20 is rotated, margins RM1 and RM2 for rotation are required in each of the direction X and the direction Y in a state in which the imaging element 20 is not rotated.

Therefore, in the example shown in FIG. 7, in a case where the imaging element 20 is rotated, it is necessary to set, as the movable range of the movable member 2 in the direction X and the direction Y, a range 14A overlapping the rectangular range 13A set to be closer to the inside than the rectangular range 11A of the maximum movable range 12A by the margins RM1 and RM2.

The range 14A shown in FIG. 7 changes depending on the combination of the type of the imaging lens 101 and the digital camera 100. In some types of the imaging lens 101, an area of the range 14A becomes too small, and the movable member 2 cannot be sufficiently moved in the direction X and the direction Y. As a result, there is a possibility that an image shake correction performance cannot be secured. Therefore, it is effective to set the range 15A shown in FIG. 7 as the movable range of the movable member 2 in the direction X and the direction Y for the imaging lens 101 in which the size of the range 14A shown in FIG. 7 is equal to or smaller than a predetermined size.

Figure 9:
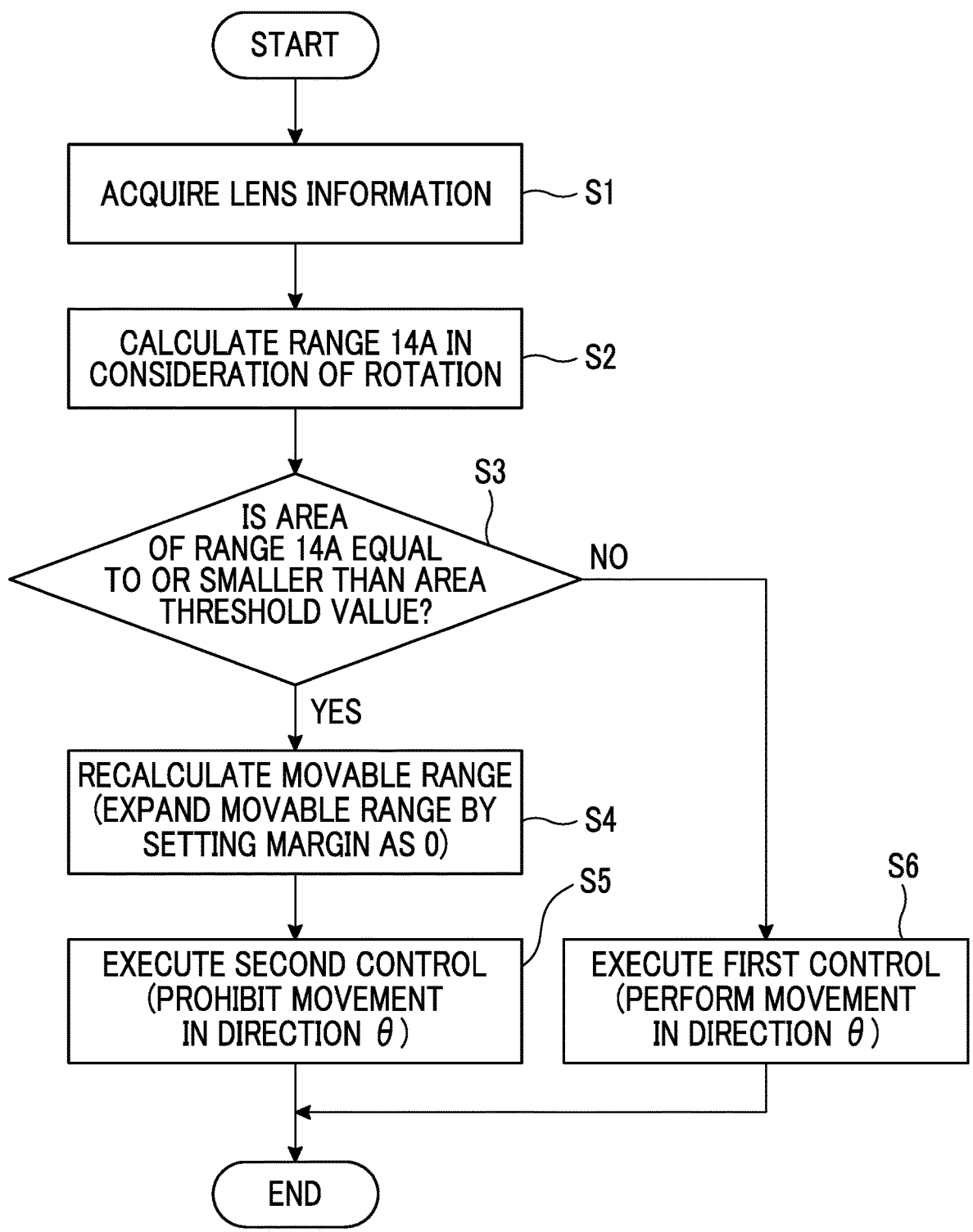
FIG. 9 is a flowchart for describing a method of controlling a drive unit using a system controller 108 shown in FIG. 1.

FIG. 9 is a flowchart for describing a method of controlling the drive unit using the system controller 108 shown in FIG. 1.

First, the system controller 108 acquires lens information from the imaging lens 101 attached to the digital camera 100 main body (step S1), and obtains the image circle 10A shown in FIG. 7 based on the acquired lens information. Then, the system controller 108 calculates the range 14A as the movable range of the movable member 2 in the direction X and the direction Y based on the image circle 10A and information of the rectangular range 11A and the maximum movable range 12A stored in advance in the memory 109 (step S2).

Subsequently, in a case where the area of the calculated range 14A is equal to or smaller than an area threshold value (step S3: YES), the system controller 108 recalculates, as the movable range of the movable member 2 in the direction X and the direction Y, the range 15A shown in FIG. 7 by setting the margins RM1 and RM2 as zero (step S4), and executes the second control according to the recalculated range 15A (step S5). Due to the second control, the image shake correction is performed by moving the movable member 2 only in at least one direction of the direction X or the direction Y in the range 15A without moving the movable member 2 in the direction θ.

Meanwhile, in a case where the area of the calculated range 14A exceeds the area threshold value (step S3: NO), the system controller 108 executes the first control according to the calculated range 14A (step S6). Due to the first control, the image shake correction is performed by moving the movable member 2 in at least one direction of the direction X, the direction Y, or the direction θ in the range 14A and moving the movable member 2 in the direction θ at a portion closer to the outside than the range 14A of the range 15A.

In step S3, the area is used as an index of the size of the range 14A. However, at least one of a maximum width of the range 14A in the direction X and a maximum width of the range 14A in the direction Y may be used as the index of the size of the range 14A.

As described above, according to the digital camera 100, in a case where the range 14A becomes small and it becomes difficult to secure the image shake correction performance, the range 15A obtained by expanding the range 14A is set as the movable range in the direction X and the direction Y, and the movable member 2 moves only in at least one direction of the direction X or the direction Y in this movable range.

Thus, even though the imaging lens 101 having a small image circle is attached, the rotation of the movable member 2 is prohibited, and thus, it is possible to sufficiently secure the image shake correction performance without reducing a movement range of the movable member 2 in the direction X and a movement range in the direction Y.

Meanwhile, in a case where the imaging lens 101 having a large image circle is attached, the range 14A in which a margin for rotating the movable member 2 is secured is set as the movable range in the direction X and the direction Y, and the movable member 2 moves in at least one direction of the direction X, the direction Y, or the direction θ in the range 15A including this movable range. Therefore, the image shake correction performance can be improved by the amount that the movable member 2 can move in the direction θ.

In the aforementioned description, the system controller 108 acquires the lens information, and performs the processing of steps S2 and S4 by using the lens information. However, information of the movable range of the movable member 2 in the direction X and the direction Y and information indicating whether to perform the first control or the second control may be obtained in advance for each identification information of the imaging lens 101, and may be stored in the ROM of the memory 109. In this case, the system controller 108 may acquire the identification information of the imaging lens 101, and may set a movable range corresponding to the identification information, and may execute control corresponding to the identification information.

Although it has been described that the imaging lens 101 is attachable and detachable in the aforementioned digital camera 100, the imaging lens 101 may be fixed to the digital camera 100 main body, and may not be changed to another object.

In this case, in the ROM of the memory 109, the information of the range 14A shown in FIG. 7 and information indicating that the first control is performed are stored in association with each other, and the information of the range 15A shown in FIG. 7 and information indicating that the second control is performed are stored in association with each other.

Figure 10:
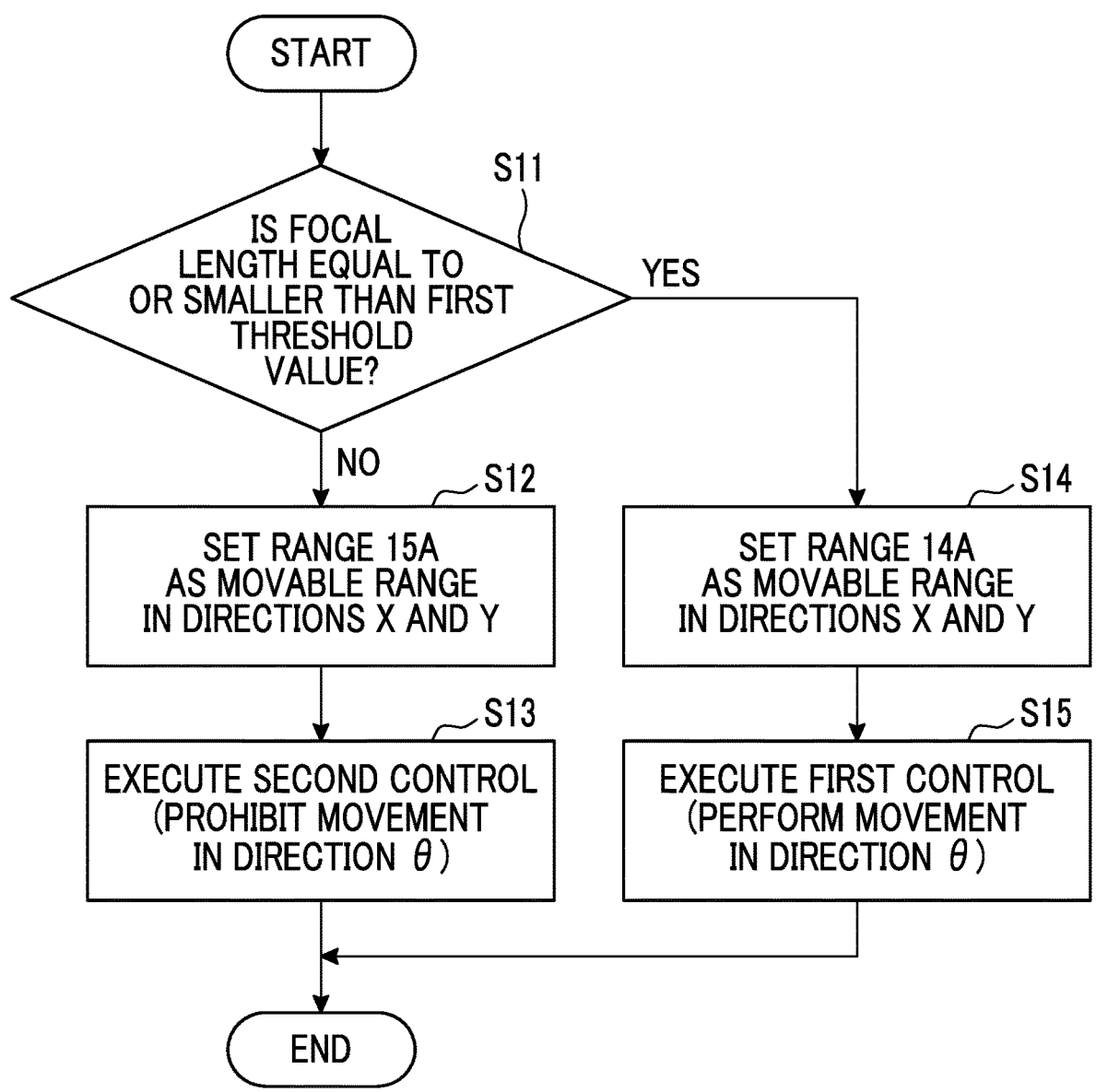
FIG. 10 is a flowchart for describing a method of controlling a drive unit using a system controller 108 of a fixed lens type digital camera 100.

FIG. 10 is a flowchart for describing a method of controlling a drive unit using a system controller 108 of a fixed lens type digital camera 100.

In a case where the digital camera 100 is set to an imaging mode, the system controller 108 determines whether or not a focal length of the imaging lens 101 is equal to or smaller than a predetermined first threshold value based on positional information of the zoom lens included in the imaging lens 101 (step S11).

In a case where the determination of step S11 is YES, the system controller 108 sets the movable range of the movable member 2 in the direction X and the direction Y to the range 14A based on the information of the range 14A stored in the ROM of the memory 109 (step S14). The system controller 108 executes the first control associated with the information of the range 14A (step S15).

Meanwhile, in a case where the determination of step S11 is NO, the system controller 108 sets the movable range of the movable member 2 in the direction X and the direction Y to the range 15A based on the information of the range 15A stored in the ROM of the memory 109 (step S12). The system controller 108 executes the second control associated with the information of the range 15A (step S13).

According to the digital camera 100 that performs the operation shown in FIG. 10 described above, the rotation of the movable member 2 is not prohibited in a case where imaging on a wide-angle side is performed. Thus, it is possible to effectively prevent the shake of the captured image in a rotation direction that is conspicuous at the time of wide-angle imaging.

According to the digital camera 100 that performs the operation shown in FIG. 10, in a case where imaging on a telephoto side is performed, the rotation of the movable member 2 is prohibited, and the movement range of the movable member 2 in the direction X and the direction Y becomes wide. Thus, it is possible to effectively prevent the shake of the captured image in the direction X and the direction Y that is conspicuous at the time of telephoto imaging.

Figure 11:
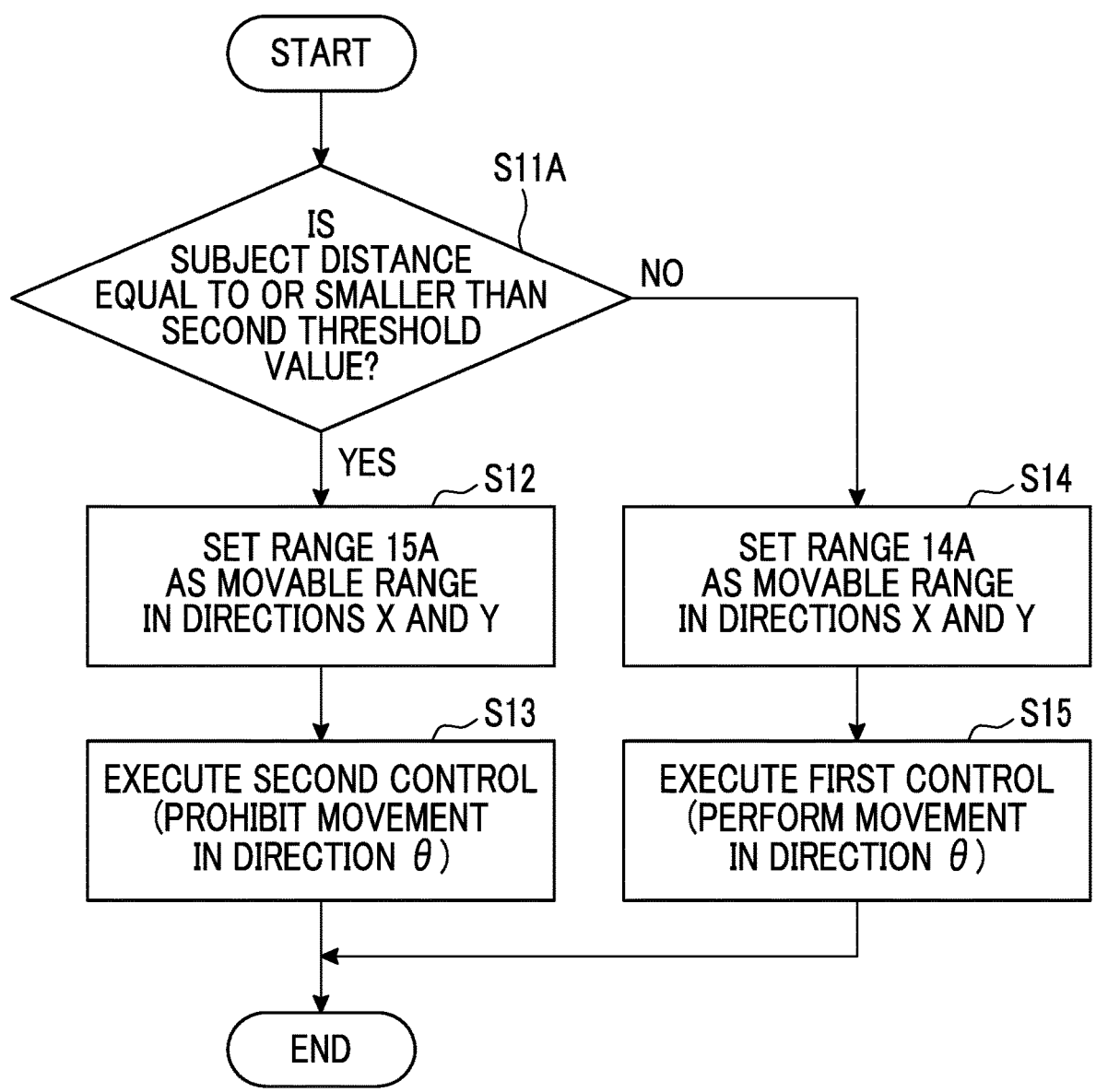
FIG. 11 is a flowchart for describing a first modification example of the method of controlling the drive unit using the system controller 108 of the fixed lens type digital camera 100.

FIG. 11 is a flowchart for describing a first modification example of the method of controlling the drive unit using the system controller 108 of the fixed lens type digital camera 100. The flowchart shown in FIG. 11 is the same as that of FIG. 10 except that step S11 is changed to step S11A.

In a case where the digital camera 100 is set to the imaging mode, the system controller 108 determines whether or not a subject distance which is a distance to the subject captured by the imaging element 20 is equal to or smaller than a predetermined second threshold value (step S11A). The subject distance can be obtained from the position of the focus lens included in the imaging lens 101, or can be obtained by analyzing the image captured by the imaging element 20.

In a case where the determination of step S11A is YES, the system controller 108 performs the processing of step S12 and subsequent steps, and in a case where the determination of step S11A is NO, the system controller 108 performs the processing of step S14 and subsequent steps.

According to the digital camera 100 that performs the operation shown in FIG. 11, in a state in which the subject is far from the digital camera 100, the movable range of the movable member 2 in the direction X and the direction Y is narrowed, but the rotation of the movable member 2 is not prohibited. In a state in which the subject to be imaged is far away, the influence of the shake of the captured image in the direction X and the direction Y is reduced. Therefore, the rotation of the movable member 2 is not prohibited, and thus, the shake correction of the captured image can be performed with high accuracy.

According to the digital camera 100 that performs the operation shown in FIG. 11, in a state in which the subject is near the digital camera 100, the rotation of the movable member 2 is prohibited, and the movement range of the movable member 2 in the direction X and the direction Y becomes wide. Thus, it is possible to effectively prevent the shake of the captured image in the direction X and the direction Y that is conspicuous at the time of capturing a nearby subject.

Figure 12:
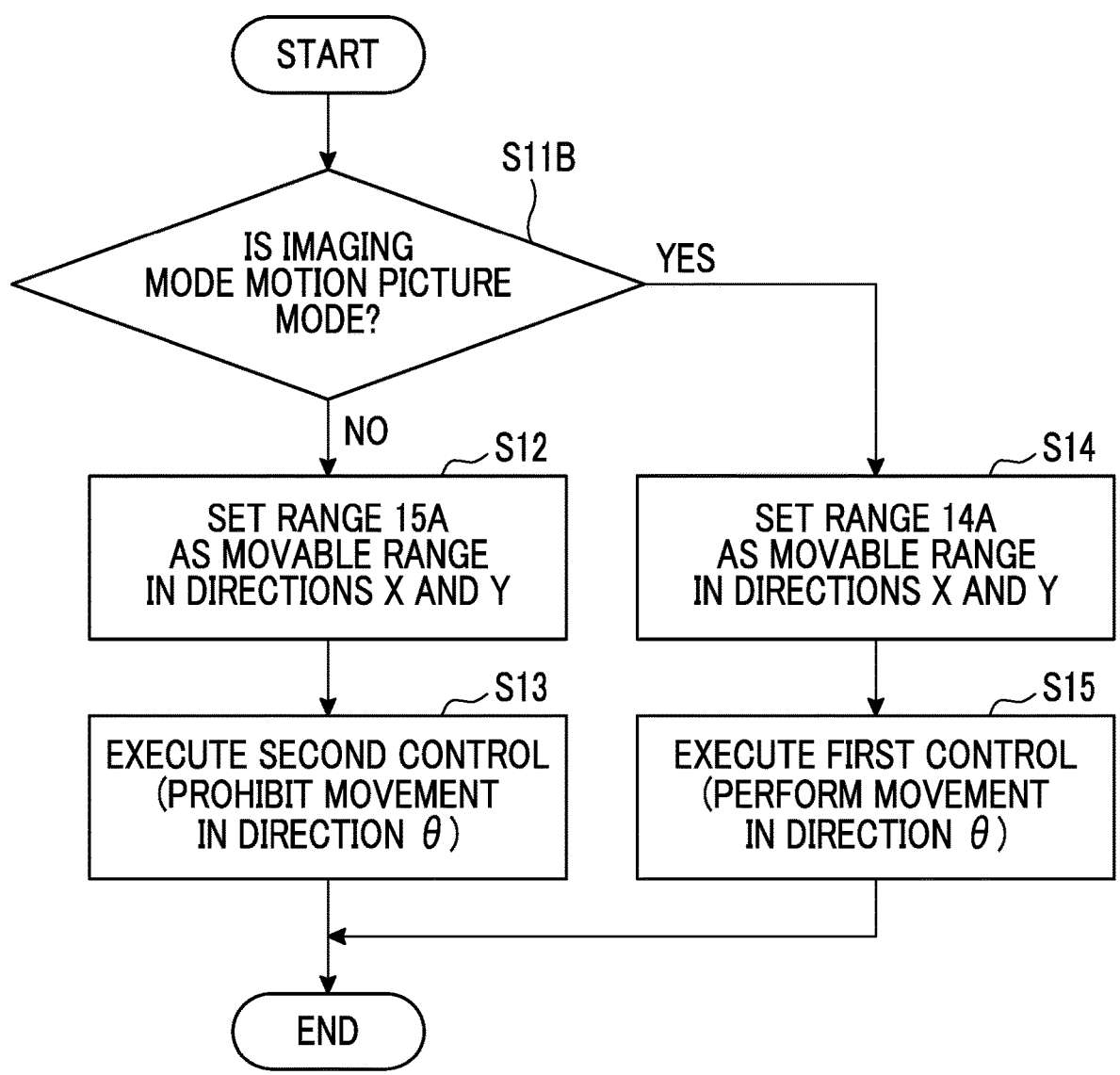
FIG. 12 is a flowchart for describing a second modification example of the method of controlling the drive unit using the system controller 108 of the fixed lens type digital camera 100.

FIG. 12 is a flowchart for describing a second modification example of the method of controlling the drive unit using the system controller 108 of the fixed lens type digital camera 100. The flowchart shown in FIG. 12 is the same as that of FIG. 10 except that step S11 is changed to step S11B.

In a case where the imaging mode is set, the system controller 108 determines whether or not the set imaging mode is a motion picture mode for performing motion picture imaging or the still image mode for performing still image imaging (step S11B).

The system controller 108 performs the processing of step S14 and subsequent steps in case where the imaging mode is the motion picture mode (step S11B: YES), and performs the processing of step S12 and subsequent steps in a case where the imaging mode is the still image mode (step S11B: NO).

According to the digital camera 100 that performs the operation shown in FIG. 12 described above, in a state in which the motion picture imaging is performed, the movable range of the movable member 2 in the direction X and the direction Y is narrowed, but the rotation of the movable member 2 is not prohibited. During the motion picture imaging, the digital camera 100 is likely to rotate. Therefore, the rotation of the movable member 2 is not prohibited, and thus, the shake correction of the captured image can be performed with high accuracy.

According to the digital camera 100 that performs the operation shown in FIG. 12, in a state in which the still image imaging is being performing, the rotation of the movable member 2 is prohibited, and the movement range of the movable member 2 in the direction X and the direction Y becomes wide. At the time of the still image imaging, it is assumed that a posture of the digital camera 100 is firmly fixed. Thus, it is possible to effectively prevent the shake of the captured image by giving priority to expanding the movement range in the direction X and the direction Y rather than the rotation of the movable member 2.

Figure 13:
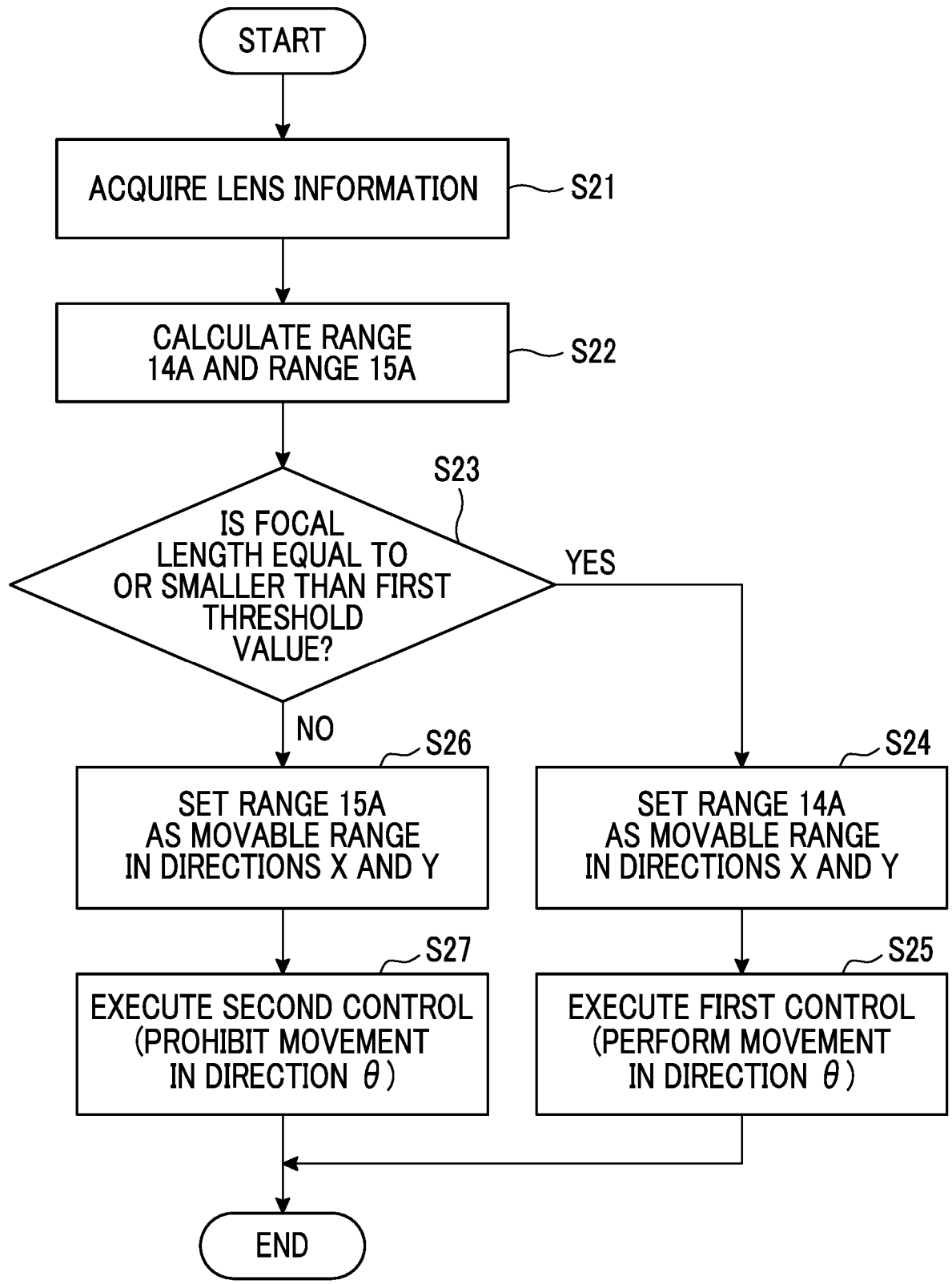
FIG. 13 is a flowchart for describing a modification example of the method of controlling the drive unit using the system controller 108 shown in FIG. 1.

FIG. 13 is a flowchart for describing a modification example of the method of controlling the drive unit using the system controller 108 shown in FIG. 1.

In a case where the imaging mode is set, the system controller 108 acquires the lens information from the imaging lens 101 attached to the digital camera 100 main body (step S21), and obtains the image circle 10A shown in FIG. 7 based on the acquired lens information. The system controller 108 calculates the range 14A and the range 15A as the movable range in the direction X and the direction Y of the movable member 2 from the image circle 10A and the information of the rectangular range 11A and the maximum movable range 12A stored in advance in the memory 109 (step S22).

Subsequently, the system controller 108 determines whether or not the focal length of the imaging lens 101 is equal to or smaller than the first threshold value based on the positional information of the zoom lens included in the imaging lens 101 (step S23).

In a case where the determination of step S23 is YES, the system controller 108 sets the range 14A calculated in step S22 as the movable range of the movable member 2 in the direction X and the direction Y (step S24). The system controller 108 executes the first control (step S25).

In a case where the determination of step S23 is NO, the system controller 108 sets the range 15A calculated in step S22 as the movable range of the movable member 2 in the direction X and the direction Y (step S26). The system controller 108 executes the second control (step S27).

According to the digital camera 100 that performs the operation shown in FIG. 13 described above, the rotation of the movable member 2 is not prohibited in a case where the imaging on the wide-angle side is performed. Thus, it is possible to effectively prevent the shake of the captured image in a rotation direction that is conspicuous at the time of wide-angle imaging.

According to the digital camera 100 that performs the operation shown in FIG. 13, in a case where the imaging on the telephoto side is performed, the rotation of the movable member 2 is prohibited, and the movement range of the movable member 2 in the direction X and the direction Y becomes wide. Thus, it is possible to effectively prevent the shake of the captured image in the direction X and the direction Y that is conspicuous at the time of telephoto imaging.

The processing of step S23 of FIG. 13 can be replaced with the processing of step S11A of FIG. 11 or the processing of step S11B of FIG. 12.

Next, a configuration of a smartphone will be described as another embodiment of the imaging device of the present invention.

Figure 14:
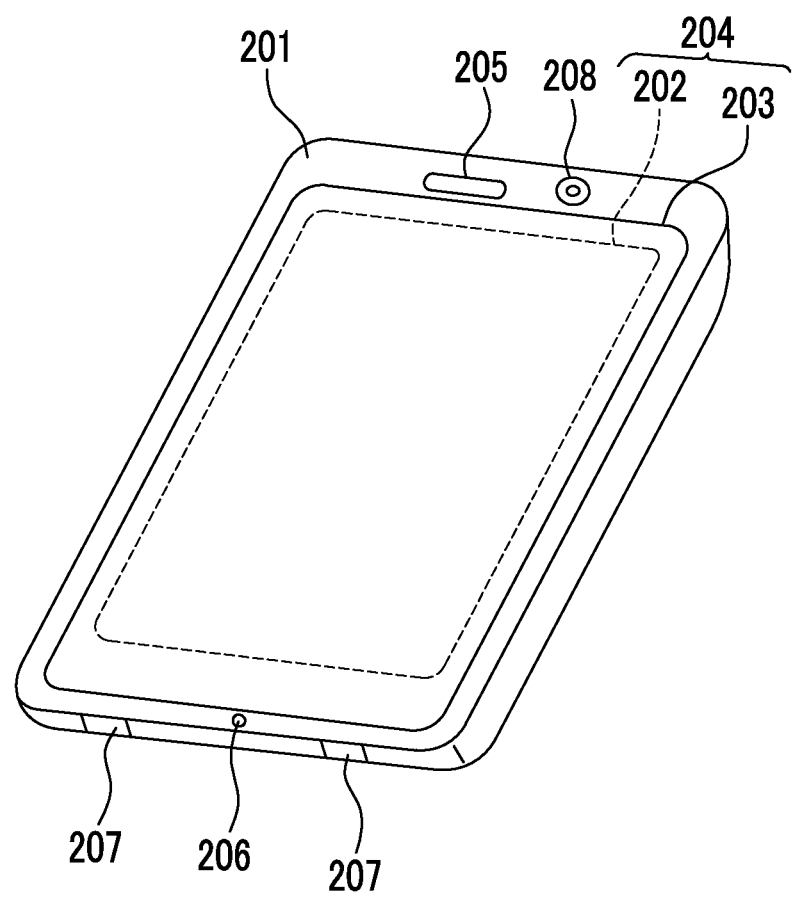
FIG. 14 shows an appearance of a smartphone 200 that is an embodiment of an imaging device of the present invention.

FIG. 14 shows an appearance of a smartphone 200 that is an embodiment of the imaging device of the present invention.

A smartphone 200 shown in FIG. 14 includes a flat plate casing 201, and comprises a display input unit 204 in which a display panel 202 as a display surface and an operation panel 203 as an input unit are integrated on one surface of the casing 201.

Such a casing 201 comprises a speaker 205, a microphone 206, an operation unit 207, and a camera unit 208. The configuration of the casing 201 is not limited thereto, and for example, a configuration in which the display surface and the input unit are independent can be employed, or a configuration having a folding structure or a slide mechanism can be employed.

Figure 15:
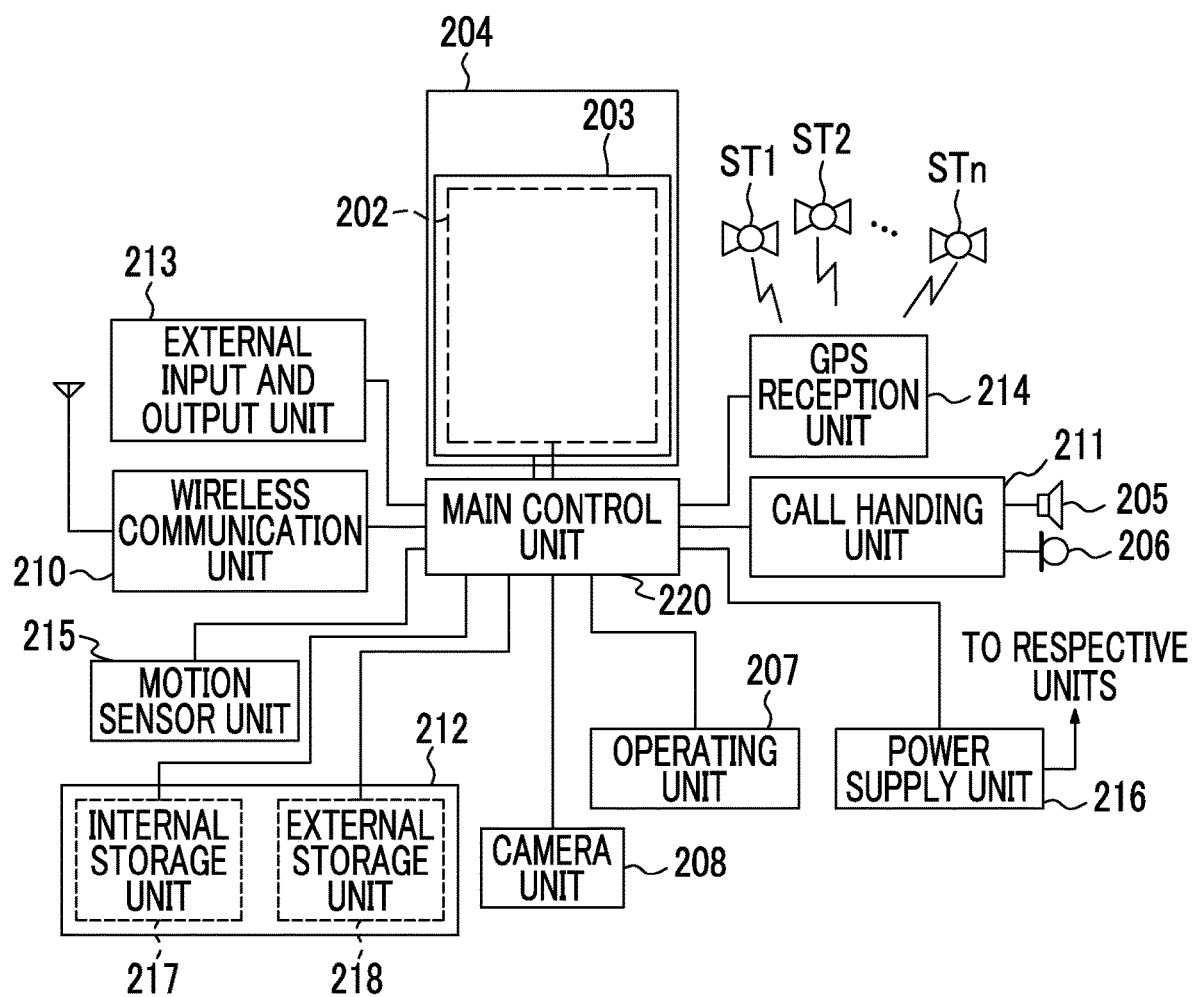
FIG. 15 is a block diagram showing a configuration of the smartphone 200 shown in FIG. 14.

FIG. 15 is a block diagram showing a configuration of the smartphone 200 shown in FIG. 14.

As shown in FIG. 15, the smartphone includes, as main components, a wireless communication unit 210, the display input unit 204, a call handling unit 211, the operation unit 207, the camera unit 208, a storage unit 212, an external input and output unit 213, a Global Positioning System (GPS) reception unit 214, a motion sensor unit 215, a power supply unit 216, and a main controller 220.

The smartphone 200 has, as a main function, a wireless communication function of performing mobile wireless communication through a base station apparatus BS (not shown) and a mobile communication network NW (not shown).

The wireless communication unit 210 performs wireless communication with the base station apparatus BS belonging to the mobile communication network NW according to an instruction of the main controller 220. The transmission and reception of various file data such as voice data, image data, and e-mail data, and reception of Web data or streaming data are performed by using this wireless communication.

Under the control of the main controller 220, the display input unit 204 displays images (still images and moving images) or text information, and visually transmits the images and information to the user, and is a so-called touch panel that detects a user operation for the displayed information. The display input unit comprises the display panel 202 and the operation panel 203.

The display panel 202 uses, as a display device, a liquid crystal display (LCD) or an organic electro-luminescence display (OELD).

The operation panel 203 is a device that is mounted so as to visually recognize the image displayed on the display surface of the display panel 202, and detects one or a plurality of coordinates operated by a finger of the user or a stylus. In a case where this device is operated by the finger of the user or the stylus, a detection signal generated due to the operation is output to the main controller 220. Subsequently, the main controller 220 detects an operation position (coordinates) on the display panel 202 based on the received detection signal.

As shown in FIG. 15, although it has been described that the display panel 202 and the operation panel 203 of the smartphone 200 shown as the embodiment of the imaging device of the present invention are integrally formed and constitute the display input unit 204, the operation panel 203 is disposed so as to completely cover the display panel 202.

In a case where such an arrangement is adopted, the operation panel 203 may have a function of detecting the user operation even in a region outside the display panel 202. In other words, the operation panel 203 may have a detection region (hereinafter, referred to as a display region) for an overlapped portion which overlaps with the display panel 202 and a detection region (hereinafter, referred to as a non-display region) for an outer edge portion which does not overlap with the display panel 202.

The size of the display region and the size of the display panel 202 may completely match each other, and it is not necessary to match both the sizes. The operation panel 203 may have the outer edge portion and two sensitive regions which are inner portions other than the outer edge. A width of the outer edge portion is appropriately designed according to the size of the casing 201.

Examples of the position detection method employed in the operation panel 203 include a matrix switch method, a resistive film method, a surface acoustic wave method, an infrared method, an electromagnetic induction method, and an electrostatic capacitance method.

The call handling unit 211 comprises the speaker 205 or the microphone 206, converts the voice of the user input through the microphone 206 into voice data capable of being processed by the main controller 220 to output the voice data to the main controller 220 or decodes the voice data received by the wireless communication unit 210 or the external input and output unit 213 to output the decoded voice data from the speaker 205.

For example, as shown in FIG. 14, the speaker 205 may be mounted on the same surface as the surface on which the display input unit 204 is provided, and the microphone 206 may be mounted on a side surface of the casing 201.

The operation unit 207 is a hardware key using a key switch, and receives an instruction from the user. For example, as shown in FIG. 14, the operation unit 207 is a push button type switch which is mounted on a side surface of the casing 201 of the smartphone 200, and is turned on by being pressed with the finger and is turned off by a restoring force such as a spring in a case where the finger is released.

The storage unit 212 stores a control program and control data of the main controller 220, application software, address data associated with a name or a telephone number of a communication partner, the transmitted and received e-mail data, Web data downloaded by Web browsing, and download content data, and temporarily stores streaming data. The storage unit 212 includes an internal storage unit 217 built in the smartphone, and an external storage unit 218 having an external memory detachably attached via a slot.

The internal storage unit 217 and the external storage unit 218 constituting the storage unit 212 is realized by using a storage medium such as a memory (for example, MicroSD (registered trademark) memory) of a flash memory type, a hard disk type, a multimedia card micro type, or a card type, a random access memory (RAM), or a read only memory (ROM).

The external input and output unit 213 serves as an interface with all external devices coupled to the smartphone 200, and directly or indirectly communicates with other external devices by (for example, universal serial bus (USB) or IEEE 1394) or a network (for example, Internet, wireless LAN, Bluetooth (registered trademark), radio frequency identification (RFID), Infrared Data Association (IrDA) (registered trademark), ultra wideband (UWB) (registered trademark), or ZigBee (registered trademark).

Examples of the external device to be connected to the smartphone 200 includes a wired or wireless headset, an external wired or wireless charger, a wired or wireless data port, a memory card to be connected through a card socket, subscriber identity module (SIM)/user identity module (UIM) card, or an external audio and video device to be connected through an audio and video input and output (I/O) terminal, an external audio and video device to be connected in a wireless manner, a smartphone to be connected in a wired or wireless manner, a personal computer to be connected in a wired or wireless manner, or an earphone to be connected in a wired or wireless connected.

The external input and output unit 213 can transfer data transmitted from the external devices to the components in the smartphone 200 or can transmit data in the smartphone 200 to the external devices.

The GPS reception unit 214 receives GPS signals transmitted from GPS satellites ST1 to STn according to an instruction of the main controller 220, performs positioning calculation processing based on a plurality of received GPS signals, and detects the position of the smartphone 200 having latitude, longitude, and altitude. In a case where positional information can be acquired from the wireless communication unit 210 or the external input and output unit 213 (for example, a wireless LAN), the GPS reception unit 214 can detect the position by using the positional information.

For example, the motion sensor unit 215 comprises a three-axis acceleration sensor, and detects physical motion of the smartphone 200 according to an instruction of the main controller 220. The movement direction or acceleration of the smartphone 200 is detected by detecting the physical motion of the smartphone 200. The detection result is output to the main controller 220.

The power supply unit 216 supplies power stored in a battery (not shown) to the respective units of the smartphone 200 according to an instruction of the main controller 220.

The main controller 220 comprises a microprocessor, operates according to the control program or control data stored in the storage unit 212, and integrally controls the units of the smartphone 200. The main controller 220 has a mobile communication control function of controlling the units of a communication system in order to perform voice communication or data communication through the wireless communication unit 210, and an application processing function.

The application processing function is realized by the main controller 220 operating according to application software stored in the storage unit 212. The application processing function is, for example, an infrared communication function of controlling the external input and output unit 213 to perform data communication with a device facing the smartphone, an electronic mail function of transmitting and receiving electronic mails, or a Web browsing function of browsing Web pages.

The main controller 220 has an image processing function of displaying video on the display input unit 204 based on image data (still image or moving image data), such as received data or downloaded streaming data.

The image processing function refers to a function of the main controller 220 decoding the image data, performing image processing on the decoding result, and displaying an image on the display input unit 204.

The main controller 220 performs display control on the display panel 202 and operation detection control for detecting a user operation through the operation unit 207 and the operation panel 203.

Through the performing of the display control, the main controller 220 displays an icon for activating application software or a software key, such as a scroll bar, or displays a window for creating electronic mails.

The scroll bar refers to a software key for receiving an instruction to move a display portion of an image which is too large to fit into the display region of the display panel 202.

Through the performing of the operation detection control, the main controller 220 detects the user operation through the operation unit 207, receives an operation on the icon or an input of a character string in an input field of the window through the operation panel 203, or receives a scroll request of a display image through the scroll bar.

Through the performing of the operation detection control, the main controller 220 has a touch panel control function of determining whether or not an operation position on the operation panel 203 is the superimposed portion (display region) overlapping the display panel 202 or the outer edge portion (non-display region) not overlapping the display panel 202 other than the display region, and controlling the sensitive region of the operation panel 203 or the display position of the software key.

The main controller 220 may detect a gesture operation on the operation panel 203 and may execute a function set in advance according to the detected gesture operation.

The gesture operation is not a conventional simple touch operation, but means an operation to render a track with a finger, an operation to simultaneously designate a plurality of positions, or an operation to render a track for at least one of a plurality of positions by combining the aforementioned operations.

The camera unit 208 includes components other than the motion detection sensor 106, the system controller 108, and the image processing unit 107 of the digital camera 100 shown in FIG. 1. In the smartphone 200, the main controller 220 controls the image shake correction mechanism 3 based on information from the motion sensor unit 215 corresponding to the motion detection sensor 106 to perform image shake correction.

Captured image data generated by the camera unit 208 can be stored in the storage unit 212 or can be output through the external input and output unit 213 or the wireless communication unit 210.

Although it has been described in the smartphone 200 shown in FIG. 14 that the camera unit 208 is mounted on the same surface as the display input unit 204, the mounting position of the camera unit 208 is not limited thereto, and the camera unit may be mounted on the rear surface of the display input unit 204.

The camera unit 208 can be used for various functions of the smartphone 200. For example, an image acquired by the camera unit 208 can be displayed on the display panel 202, or an image in the camera unit 208 can be used as one operation input of the operation panel 203.

In a case where the GPS reception unit 214 detects the position, the position may be detected by referring to an image from the camera unit 208. The optical axis direction of the camera unit 208 of the smartphone 200 can be determined or a current usage environment may be determined by referring to an image from the camera unit 208 without using the three-axis acceleration sensor or in combination with the three-axis acceleration sensor. An image from the camera unit 208 may be used in application software.

Image data of a still image or a motion picture may be attached with positional information acquired by the GPS reception unit 214, voice information (which may be converted to text information through voice-text conversion by the main controller) acquired by the microphone 206, or posture information acquired by the motion sensor unit 215 and can be recorded in the storage unit 212, or may be output through the external input and output unit 213 or the wireless communication unit 210.

In the smartphone 200 having the aforementioned configuration, the image shake correction device has the aforementioned configuration, and thus, it is possible to obtain various effects.

As described above, the following items are disclosed in this specification.

(1) An image shake correction device comprises a drive unit that moves a movable unit including an imaging element in a first direction and a second direction perpendicular to each other along a light receiving surface of the imaging element, and a third direction along a circumferential direction of a circle with a center of the light receiving surface of the imaging element as a center, and a controller that controls the drive unit. The controller selectively performs a first control for moving the movable unit in at least one direction of the first direction, the second direction, or the third direction, and a second control for prohibiting movement of the movable unit in the third direction and moving the movable unit only in at least one direction of the first direction or the second direction, and the controller sets a movable range of the movable unit in the first direction and the second direction in a case where the second control is performed to be wider than the movable range of the movable unit in the first direction and the second direction in a case where the first control is performed.

(2) In the image shake correction device according to (1), the controller decides whether to perform the first control or the second control based on a type of an imaging lens disposed in front of the imaging element.

(3) In the image shake correction device according to (1), the controller decides whether to perform the first control or the second control based on an imaging condition of the imaging element.

(4) The image shake correction device according to (3), the controller performs the first control in a case where a focal length of an imaging lens disposed in front of the imaging element is equal to or smaller than a first threshold value, and performs the second control in a case where the focal length exceeds the first threshold value.

(5) In the image shake correction device according to (3), the controller performs the second control in a case where a distance to a subject captured by the imaging element is equal to or smaller than a second threshold value, and performs the first control in a case where the distance exceeds the second threshold value.

(6) The image shake correction device according to (3), the controller performs the first control in a case where imaging of a motion picture is performed by the imaging element, and performs the second control in a case where imaging of a still image is performed by the imaging element.

(7) An imaging device comprises the image shake correction device according to any one of (1) to (6).

(8) An image shake correction method comprises a control step of controlling a drive unit that moves a movable unit including an imaging element in a first direction and a second direction perpendicular to each other along a light receiving surface of the imaging element, and a third direction along a circumferential direction of a circle with a center of the light receiving surface of the imaging element as a center. In the control step, a first control for moving the movable unit in at least one direction of the first direction, the second direction, or the third direction, and a second control for prohibiting movement of the movable unit in the third direction and moving the movable unit only in at least one direction of the first direction or the second direction is selectively performed, and a movement range in which the movable unit is able to move in each of the first direction and the second direction in a case where the second control is performed is further set to be wider than the movement range in a case where the first control is performed.

(9) In the image shake correction method according to (8), in the control step, whether to perform the first control or the second control is decided based on a type of an imaging lens disposed in front of the imaging element.

(10) In the image shake correction method according to (8), in the control step, whether to perform the first control or the second control is decided based on an imaging condition of the imaging element.

(11) In the image shake correction method according to (10), in the control step, the first control is performed in a case where a focal length of the imaging lens disposed in front of the imaging element is equal to or smaller than a first threshold value, and the second control is performed in a case where the focal length exceeds the first threshold value.

(12) In the image shake correction method according to (10), in the control step, the second control is performed in a case where a distance to a subject captured by the imaging element is equal to or smaller than a second threshold value, and the first control is performed in a case where the distance exceeds the second threshold value.

(13) In the image shake correction method according to (10), in the control step, the first control is performed in a case where imaging of a motion picture is performed by the imaging element, and the second control is performed in a case where imaging of a still image is performed by the imaging element.

(14) An image shake correction program causes a computer to execute a control step of controlling a drive unit that moves a movable unit including an imaging element in a first direction and a second direction perpendicular to each other along a light receiving surface of the imaging element, and a third direction along a circumferential direction of a circle with a center of the light receiving surface of the imaging element as a center. In the control step, a first control for moving the movable unit in at least one direction of the first direction, the second direction, or the third direction, and a second control for prohibiting movement of the movable unit in the third direction and moving the movable unit only in at least one direction of the first direction or the second direction is selectively performed, and a movement range in which the movable unit is able to move in each of the first direction and the second direction in a case where the second control is performed is further set to be wider than the movement range in a case where the first control is performed.

Although various embodiments have been described with reference to the drawings, the present invention is not limited to such examples. It is clear that those skilled in the art can conceive various changes or modifications within the scope described in the claims, and it should be understood that these changes and modifications belong to the technical scope of the present invention. Each component in the aforementioned embodiment may be arbitrarily combined without departing from the spirit of the invention.

This application is based on a Japanese patent application filed on Dec. 27, 2017 (Japanese Patent Application No. 2017-252253), the contents of which are incorporated herein by reference.

The present invention is highly convenient and effective by being applied to a digital camera such as a single-lens reflex camera or a mirrorless camera, an in-vehicle camera, a surveillance camera, or a smartphone.

EXPLANATION OF REFERENCES

100: digital camera
101: imaging lens
20: imaging element
3: image shake correction mechanism
104: AFE
105: imaging element drive unit
106: motion detection sensor
107: image processing unit
108: system controller
109: memory
K: optical axis
1: support member
1A: first support member
Mh1: X-axis position detection magnet
Mh2: Y-axis rotation position detection magnet
Mh3: Y-axis rotation position detection magnet
1s, 2s, 3s: S-pole
1n, 2n, 3n: N-pole
Mv1: X-axis rotation drive magnet
Mv2: X-axis rotation drive magnet
Mv3: Y-axis drive magnet
1B: second support member
mv1: X-axis rotation drive magnet
mv2: X-axis rotation drive magnet
mv3: Y-axis drive magnet
2: movable member
C1: X-axis rotation drive coil
C2: X-axis rotation drive coil
C3: Y-axis drive coil
21: circuit board
H1: X-axis position detection Hall element
H2: Y-axis rotation position detection Hall element
H3: Y-axis rotation position detection Hall element
24a, 24b, 24c: spring
20a: light receiving surface
P: center of light receiving surface
R: rotation axis
10: base
12, 14: yoke
13: coupling member
15a, 15b, 15c: flat surface
16a, 16b, 16c: hook
17a, 17b, 17c: projecting portion
18: yoke
19a: hole portion
19b, 19c: notch portion
22: base
23a, 23b, 23c: hook
29a, 29b, 29c: bottom surface 290a, 290b, 290c: recess portion
10A: image circle
11A: rectangular range
12A: maximum movable range
13A: rectangular range
14A, 15A: range
RM1, RM2: margin
200: smartphone
201: casing
202: display panel
203: operation panel
204: display input unit
205: speaker
206: microphone
207: operation unit
208: camera unit
210: wireless communication unit
211: call handling unit
212: storage unit
213: external input and output unit
214: GPS reception unit
215: motion sensor unit
216: power supply unit
217: internal storage unit
218: external storage unit
220: main controller
ST1 to STn: GPS satellites

What is claimed is:

1. An image shake correction device comprising:
a drive unit that moves a movable unit including an imaging element in a first direction, in a second direction perpendicular to the first direction, the first direction and the second direction being directions along a light receiving surface of the imaging element, and in a third direction along a circumferential direction of a circle a center of which is a center of the light receiving surface of the imaging element; and
a controller that controls the drive unit,
wherein the controller selectively performs a first control for moving the movable unit in at least one direction of the first direction, the second direction, or the third direction, and a second control for prohibiting movement of the movable unit in the third direction and for moving the movable unit only in at least one direction of the first direction or the second direction, and
the controller sets, in performing the second control, a movable range of the movable unit in the first direction and the second direction to be wider than the movable range of the movable unit in the first direction and the second direction in performing the first control.

2. The image shake correction device according to claim 1,
wherein the controller determines whether to perform the first control or the second control based on a type of an imaging lens arranged in association with the imaging element.

3. The image shake correction device according to claim 1,
wherein the controller determines whether to perform the first control or the second control based on an imaging condition of the imaging element.

4. The image shake correction device according to claim 3,
wherein the controller performs the first control in a case where a focal length of an imaging lens arranged in association with the imaging element is equal to or smaller than a first threshold value, and performs the second control in a case where the focal length exceeds the first threshold value.

5. The image shake correction device according to claim 3,
wherein the controller performs the second control in a case where a distance to a subject captured by the imaging element is equal to or smaller than a second threshold value, and performs the first control in a case where the distance exceeds the second threshold value.

6. The image shake correction device according to claim 3,
wherein the controller performs the first control in a case where imaging of a motion picture is performed by the imaging element, and performs the second control in a case where imaging of a still image is performed by the imaging element.

7. An imaging device comprising the image shake correction device according to claim 1.

8. An image shake correction method comprising:
a control step of controlling a drive unit that moves a movable unit including an imaging element in a first direction, in a second direction perpendicular to the first direction, the first direction and the second direction being directions along a light receiving surface of the imaging element, and in a third direction along a circumferential direction of a circle a center of which is a center of the light receiving surface of the imaging element,
wherein, in the control step, a first control for moving the movable unit in at least one direction of the first direction, the second direction, or the third direction, and a second control for prohibiting movement of the movable unit in the third direction and for moving the movable unit only in at least one direction of the first direction or the second direction is selectively performed, and
a movement range in which the movable unit is able to move in each of the first direction and the second direction in performing the second control is set to be wider than the movement range in performing the first control.

9. The image shake correction method according to claim 8,
wherein, in the control step, whether to perform the first control or the second control is determined based on a type of an imaging lens arranged in association with the imaging element.

10. The image shake correction method according to claim 8,
wherein, in the control step, whether to perform the first control or the second control is determined based on an imaging condition of the imaging element.

11. The image shake correction method according to claim 10,
wherein, in the control step, the first control is performed in a case where a focal length of the imaging lens arranged in association with the imaging element is equal to or smaller than a first threshold value, and the second control is performed in a case where the focal length exceeds the first threshold value.

12. The image shake correction method according to claim 10,
wherein, in the control step, the second control is performed in a case where a distance to a subject captured by the imaging element is equal to or smaller than a second threshold value, and the first control is performed in a case where the distance exceeds the second threshold value.

13. The image shake correction method according to claim 10,
wherein, in the control step, the first control is performed in a case where imaging of a motion picture is performed by the imaging element, and the second control is performed in a case where imaging of a still image is performed by the imaging element.

14. A non-transitory computer readable medium storing an image shake correction program causing a computer to execute a control step of controlling a drive unit that moves a movable unit including an imaging element in a first direction, in a second direction perpendicular to the first direction, the first direction and the second direction being directions along a light receiving surface of the imaging element, and in a third direction along a circumferential direction of a circle a center of which is a center of the light receiving surface of the imaging element,
wherein, in the control step, a first control for moving the movable unit in at least one direction of the first direction, the second direction, or the third direction, and a second control for prohibiting movement of the movable unit in the third direction and for moving the movable unit only in at least one direction of the first direction or the second direction is selectively performed, and a movement range in which the movable unit is able to move in each of the first direction and the second direction in performing the second control is set to be wider than the movement range in performing the first control.

* * * * *